US006678291B2

(12) United States Patent
Vogler et al.

(10) Patent No.: US 6,678,291 B2
(45) Date of Patent: Jan. 13, 2004

(54) MOLECULAR FLUORINE LASER

(75) Inventors: Klaus Wolfgang Vogler, Goettingen (DE); Juergen Kleinschmidt, Weissenfels (DE)

(73) Assignee: Lambda Physik AG, Gottingen (DE)

( * ) Notice: Subject to any disclaimer, the term of this patent is extended or adjusted under 35 U.S.C. 154(b) by 488 days.

(21) Appl. No.: 09/738,849

(22) Filed: Dec. 15, 2000

(65) Prior Publication Data

US 2002/0176469 A1 Nov. 28, 2002

Related U.S. Application Data

(60) Provisional application No. 60/173,993, filed on Dec. 30, 1999, and provisional application No. 60/170,919, filed on Dec. 15, 1999.

(51) Int. Cl.[7] .................................................. H01S 3/13
(52) U.S. Cl. ........................... 372/32; 372/98; 372/99; 372/100; 372/57; 372/102
(58) Field of Search ............................ 372/57, 98, 99, 372/100, 102, 9, 20

(56) References Cited

U.S. PATENT DOCUMENTS

| 3,471,800 A | 10/1969 | Congleton et al. .......... 331/94.5 |
| 3,546,622 A | 12/1970 | Peterson et al. ........... 331/94.5 |

(List continued on next page.)

FOREIGN PATENT DOCUMENTS

| DE | 298 22 090 U 1 | 3/1999 | ............. H01S/3/08 |
| DE | 299 07 349 U 1 | 8/2000 | ............ H01S/3/086 |
| EP | 1 041 689 A1 | 10/2000 | ......... H01S/3/1055 |
| EP | 1 102 368 A2 | 5/2001 | ............ H01S/3/081 |
| EP | 1 119 083 A2 | 7/2001 | ............. H01S/3/08 |
| JP | 60 16479 | 1/1985 | ........... H01S/3/081 |
| JP | 8 274399 | 11/1986 | ........... H04S/3/104 |
| JP | 62 160783 | 7/1987 | ........... H01S/3/115 |
| JP | 2 152288 | 6/1990 | ........... H01S/3/106 |

OTHER PUBLICATIONS

McKee, T., "Spectral–narrowing Techniques for Excimer Laser Oscillators," *Can J Phys*, 1985, vol. 63., pp. 214–219.
Traub, W., "Constant–dispersion Grism Spectrometer for Channeled Spectra," *Optical Society of America*, Sep. 1990, vol. 7., No. 9., pp. 1779–1791.
Demtroder, W., Laser Spectroscopy Springer, *Berlin Heidelberg*, 1996, pp. 99–220.

(List continued on next page.)

*Primary Examiner*—Leon Scott, Jr.

(57) ABSTRACT

An efficient $F_2$ laser is provided with improvements in line selection, monitoring capabilities, alignment stabilization, performance at high repetition rates and polarization characteristics. Line selection is preferably provided by a transmission grating or a grism. The grating or grism preferably outcouples the laser beam. The line selection may be fully provided at the front optics module. A monitor grating and an array detector monitor the intensity of the selected (and unselected) lines for line selection control. An energy detector is enclosed in an inert gas purged environment at slight overpressure. A blue or green reference beam is used for $F_2$ laser beam alignment stabilization and/or spectral monitoring of the output laser beam. The blue or green reference beam advantageously is not reflected out with a atomic fluorine red emission of the laser and is easily resolved from the red emission. The clearing ratio of the laser gas flow through the discharge area is reduced by narrowing the discharge width using improved laser electrodes and/or by increasing the gas flow rate through the discharge while maintaining uniformity by using a more aerodynamic discharge chamber. The $F_2$ laser beam is substantially polarized, e.g., 98% or better, using at least one intracavity polarization element preferably in combination with Brewster discharge chamber windows.

22 Claims, 20 Drawing Sheets

U.S. PATENT DOCUMENTS

| | | | |
|---|---|---|---|
| 3,609,586 A | 9/1971 | Danielmeyer et al. | 331/94.5 |
| 4,399,540 A | 8/1983 | Bucher | 372/28 |
| 4,611,270 A | 9/1986 | Klauminzer et al. | 364/183 |
| 4,616,908 A | 10/1986 | King | 350/576 |
| 4,696,012 A | 9/1987 | Harshaw | 372/99 |
| 4,803,696 A | 2/1989 | Pepper et al. | 372/95 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,221,823 A | 6/1993 | Usui | 219/121.78 |
| 5,226,050 A | 7/1993 | Burghardt | 372/20 |
| 5,373,515 A | 12/1994 | Wakabayashi et al. | 372/20 |
| 5,396,514 A | 3/1995 | Voss | 372/57 |
| 5,404,366 A | 4/1995 | Wakabayashi et al. | 372/29 |
| 5,406,571 A | 4/1995 | Bucker et al. | 372/20 |
| 5,440,574 A | 8/1995 | Sobottke et al. | 372/34 |
| 5,440,578 A | 8/1995 | Sandstrom | 372/59 |
| 5,479,431 A | 12/1995 | Sobottke et al. | 372/92 |
| 5,532,880 A | 7/1996 | Robb | 359/665 |
| 5,559,584 A | 9/1996 | Miyaji et al. | 355/73 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |
| 5,625,499 A | 4/1997 | Chen | 359/831 |
| 5,652,681 A | 7/1997 | Chen et al. | 359/831 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,565 A | 3/1998 | Meller et al. | 372/87 |
| 5,761,236 A | 6/1998 | Kleinschmidt et al. | 372/100 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,835,520 A | 11/1998 | Das et al. | 372/57 |
| 5,852,627 A | 12/1998 | Ershov et al. | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/50 |
| 5,917,849 A | 6/1999 | Ershov | 372/102 |
| 5,946,337 A | 8/1999 | Govorkov et al. | 372/92 |
| 5,970,082 A | 10/1999 | Ershov | 372/102 |
| 5,978,409 A | 11/1999 | Das et al. | 372/100 |
| 5,999,318 A | 12/1999 | Morton et al. | 359/572 |
| 6,014,206 A | 1/2000 | Basting et al. | 356/138 |
| 6,016,479 A | 1/2000 | Taricani, Jr. | 705/19 |
| 6,018,537 A | 1/2000 | Hofmann et al. | 372/25 |
| 6,028,879 A | 2/2000 | Ershov | 372/57 |
| 6,028,880 A | 2/2000 | Carlesi et al. | 372/58 |
| 6,061,382 A | 5/2000 | Govorkov et al. | 372/101 |
| 6,128,323 A | 10/2000 | Myers et al. | 372/38 |
| 6,154,470 A | 11/2000 | Basting et al. | 372/19 |
| 6,240,110 B1 | 5/2001 | Ershov | 372/20 |

OTHER PUBLICATIONS

Hultzsch, R., "Gitterprismen," *Photonik*, Sep. 1998., pp. 40–41.

Geyer et al., Double Gratings–Prism, *Astr. Astraphys.*, vol. 148., pp. 312–316.

Translation from German to English: Rainer Haltzsch, "Grating Prisms," Hultzsch, R.,"Gitterprismen," *Photonik*. Sep. 1998, pp. 40–41.

Book by Erwin G. Loewen and Evgeny Popov: "Diffraction Gratings and Applications," 1997, pp. 1–588.

Output spectrum of free-running $F_2$ laser with helium as a buffer gas

Emission spectrum of free-running $F_2$ laser with neon as buffer gas

Angular dispersion by an usual prism $\varepsilon$: prism angle
$\alpha_1$: angle of incidence
$\alpha_2$: output reflection angle
a: beam dimension
n: refractive index of the prism
L: length of the basis
$\theta$: angle of beam deflection

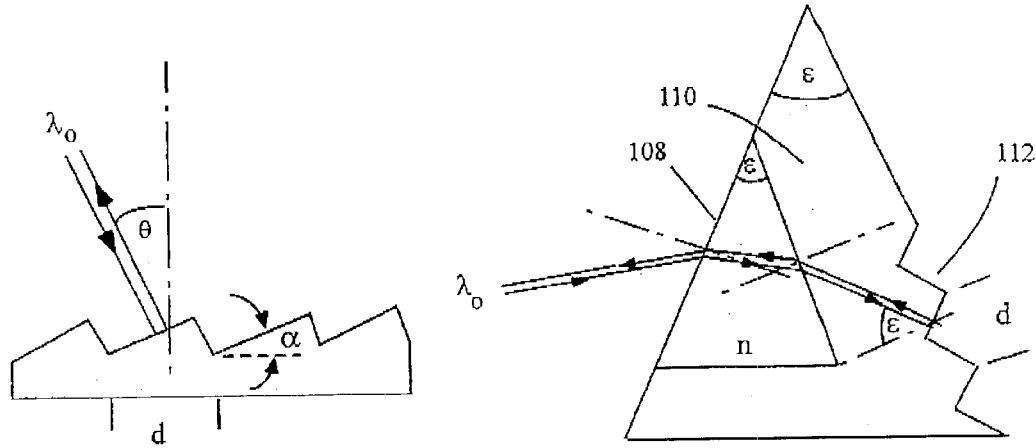
Comparison of action of Littrow grating and grism as wavelength selectivere refereflectors
Fig. 7A                    Fig. 7B

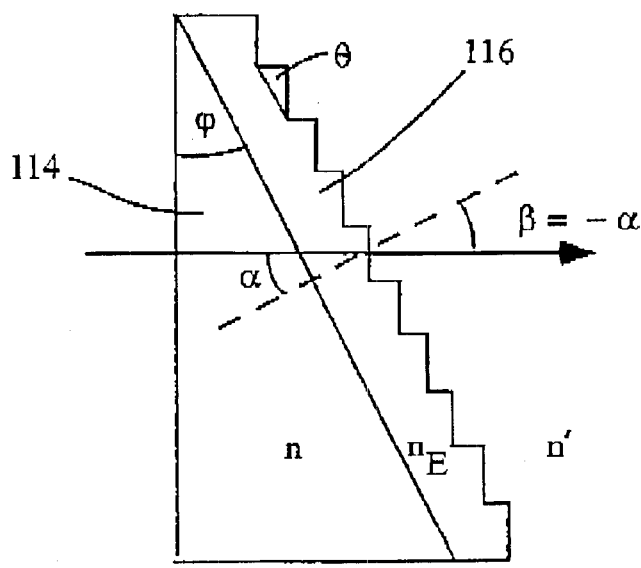

Grating prism (grism) designed for a straight-through path for one selected wavelength

- $\Phi$: prism angle
- $\Theta$: blaze angle of the grating
- (grating is attached or cut into the original prism material).
- $\alpha, \beta$: angle of incidence, refraction with request to the grating normal, respectively
- $n, n_E, n'$ refractive indices of the prism, grating at ambient atmosphere, respectively ($n' = 1$ for air) prism and grating identical material $n = n_E$

Fig.8

Resoliotos design             Band width

Resonator for line narrowing or lines selection using the grism as an output coupler according the present invention

MOLECULAR FLUORINE LASER

PRIORITY

This application claims the benefit of priority to U.S. provisional applications No. 60/173,993, filed Dec. 30, 1999, and No. 60/170,919, filed Dec. 15, 1999, each application being assigned to the same assignee as the present application and being hereby incorporated by reference.

BACKGROUND OF THE INVENTION

1. Field of the Invention

The invention relates to a molecular fluorine ($F_2$) laser, and particularly to an $F_2$-laser with an improved resonator design and improved beam monitoring and line-selection for providing stable output beam parameters at high operating repetition rates.

2. Discussion of the Related Art a. VUV microlithography

Semiconductor manufacturers are currently using deep ultraviolet (DUV) lithography tools based on KrF-excimer laser systems operating around 248 nm, as well as the following generation of ArF-excimer laser systems operating around 193 nm. Vacuum UV (VUV) will use the $F_2$-laser operating around 157 nm.

The construction and electrical excitation of the $F_2$-laser differs fundamentally from the rare gas-halide excimer lasers mentioned above. The laser gas of a rare gas-halide excimer laser, such as the KrF or ArF laser, includes a laser active molecular species that has no bound ground state, or at most a weakly bound ground state. The laser active gas molecule of the excimer laser dissociates into its constituent atomic components upon optical transition from an upper metastable state to a lower energy state. In contrast, the laser active gas constituent molecule ($F_2$) of the $F_2$-laser responsible for the emission around 157 nm is bound and stable in the ground state. In this case, the $F_2$ molecule does not dissociate after making its optical transition from the upper to the lower state.

The $F_2$-laser has an advantageous output emission spectrum including one or more lines around 157 nm. This short wavelength is advantageous for photolithography applications because the critical dimension (CD), which represents the smallest resolvable feature size producible using photolithography, is proportional to the wavelength. This permits smaller and faster microprocessors and larger capacity DRAMs in a smaller package. The high photon energy (i.e., 7.9 eV) is also readily absorbed in high band gap materials like quartz, synthetic quartz ($SiO_2$), Teflon (PTFE), and silicone, among others, such that the $F_2$-laser has great potential in a wide variety of materials processing applications. It is desired to have an efficient $F_2$ laser for these and other industrial, commercial and scientific applications.

b. line-selection and line-narrowing

The emission of the $F_2$-laser includes at least two characteristic lines around $\lambda_1 = 157.629$ nm and $\lambda_2 = 157.523$ nm. Each line has a natural linewidth of less than 15 pm (0.015 nm), and in the usual pressure range between 2–4 bar, the natural linewidth can be less than 2 pm. The intensity ratio between the two lines is $I(\lambda_1)/I(\lambda_2) 0.7$. See V. N. Ishenko, S. A. Kochubel, and A. M. Razher, Sov. Journ. QE-16, 5 (1986). FIGS. 1a and 1b illustrate the two above-described closely-spaced peaks of the $F_2$-laser spontaneous emission spectrum. FIG. 1b shows a third $F_2$ laser emission line around 157 nm that is observed when neon is used as a buffer gas, but that is not observed when the buffer gas used is strictly helium, as shown in FIG. 1a (see U.S. patent application Ser. No. 09/317,526, which is assigned to the same assignee as the present application and is hereby incorporated by reference). Either way, the characteristic bandwidth of the 157 nm emission of the $F_2$ laser is effectively more than 100 pm due to the existence of the multiple lines.

Integrated circuit device technology has entered the sub-0.18 micron regime, thus necessitating very fine photolithographic techniques. Line narrowing and tuning is required in KrF- and ArF-excimer laser systems due to the breadth of their natural emission spectra (around 400 pm). Narrowing of the linewidth is achieved most commonly through the use of a line-narrowing unit consisting of one or more prisms and a diffraction grating known as a "Littrow configuration". However, for an $F_2$-laser operating at a wavelength of approximately 157 nm, use of a reflective diffraction grating is unsatisfactory because a typical reflective grating exhibits low reflectivity and a laser employing such a grating has a high oscillation threshold at this wavelength. The selection of a single line of the $F_2$ laser output emission around 157 nm has been advantageously achieved and described at U.S. patent application Ser. Nos. 09/317,695 and 09/317,527, each of which is assigned to the same assignee as the present application and is hereby incorporated by reference. It is desired to improve upon the line-selection techniques set forth in the '695 and '527 applications. Moreover, it is desired to have a way of monitoring the quality of the line selection being performed.

For an excimer laser, such as a KrF- or ArF-excimer laser, the characteristic emission spectrum may be as broad as 400 pm. To narrow the output bandwidth, one or more dispersive line-narrowing optics are inserted into the resonator. To increase the angular (and spectral) resolution commonly more than one optical dispersive element is introduced. A typical line-narrowing arrangement for a KrF- or ArF-excimer laser includes a multiple prism beam expander before a grating in Littrow configuration. The length of the resonator increases as more optical elements as added. Also, additional optical interfaces gives rise to losses which result in a decrease of the output power for a given input voltage. It is desired to reduce the number of optical components in a line-narrowed excimer laser.

c. absorption

The $F_2$-laser has been known since around 1977 [see, e.g., Rice et al., VUV Emissions from Mixtures of $F_2$ and the Noble Gases-A Molecular $F_2$ laser at 1575 angstroms, Applied Physics Letters, Vol. 31, No. 1, Jul. 1, 1977]. However, previous $F_2$-lasers have been known to exhibit relatively low gains and short gas lifetimes. Other parameters such as the pulse-to-pulse stabilities and laser tube lifetimes have been unsatisfactory. In addition, oxygen and water exhibit high absorption cross sections around the desired 157 nm emission line of the $F_2$-laser, further reducing overall efficiency at the wafer when encountered by the laser beam anywhere along its path. To prevent this absorption, one can maintain a purged or evacuated beam path for the $F_2$-laser free of oxygen, hydrocarbons and water (see U.S. patent application Ser. No. 09/343,333, which is assigned to the same assignee as the present application and is hereby incorporated by reference). In short, despite the desirability of using short emission wavelengths for photolithography, $F_2$-lasers have seen very little practical industrial application to date. It is desired to have an $F_2$-laser with enhanced gain, longer pulse lengths, enhanced energy stability, and increased lifetime.

$F_2$-lasers are also characterized by relatively high intracavity losses, due to absorption and scattering in gases and optical elements within the laser resonator, particularly again in oxygen and water vapor which absorb strongly around 157 nm. The short wavelength (157 nm) is responsible for the high absorption and scattering losses of the $F_2$-laser, whereas the KrF-excimer laser operating at 248 nm does not experience losses of such a comparably high degree. In addition, output beam characteristics are more sensitive to temperature induced variations effecting the production of smaller structures lithographically at 157 nm, than those for longer wavelength lithography such as at 248 nm and 193 nm. Therefore, the advisability of taking steps to optimize resonator efficiency is recognized in the present invention.

d. atomic fluorine visible emission

The VUV laser radiation around 157 nm of the $F_2$-molecule has been observed as being accompanied by further laser radiation output in the red region of the visible spectrum, i.e., from 630–780 nm. This visible light originates from the excited fluorine atom (atomic transition). It is desired to have an $F_2$-laser wherein the output in the visible region is minimized and also to maximize the energy in the VUV region.

Although the active constituent in the gas mixture of the $F_2$-laser is fluorine, the amount of pure fluorine amounts to no more than about 5 to 10 mbar of partial pressure within the gas mixture, and typically less than 5 mbar. A higher overall pressure is needed to sustain a uniform discharge. Consequently, a buffer gas is needed to raise the discharge vessel pressure, typically to well above atmospheric pressure (e.g., 2–10 bars), in order to achieve an efficient excitation within the discharge and realize an efficient output of the 157 nm radiation.

For this reason, $F_2$-lasers have gas mixtures including an inert buffer gas which is typically helium and/or neon. When helium is used, however, the output in the red visible region can range from one to more than three percent of the VUV emission. In addition, the VUV pulse lengths tend to be relatively short. The visible output of the $F_2$ laser has been advantageously reduced by using neon or a combination of neon and helium as the buffer gas in the $F_2$ laser (see the '526 application). In addition, the length of the VUV output pulses of the $F_2$ laser has been shown in the '526 application to be increased using neon in the gas mixture improving both line selection and line narrowing capability. It is desired to further reduce the influence of the visible emission on the performance of the $F_2$ laser.

e. relatively short pulse duration

As noted above, the pulse duration of the $F_2$ laser is relatively short compared with that of the rare gas-halide excimer lasers. For example, KrF laser pulses make between four and six roundtrips through the laser resonator, whereas $F_2$ laser pulses typically make only one to two roundtrips. This reduces the effectiveness of the line-selection and narrowing components of the resonator. The short pulse duration also reduces the polarizing influence of surfaces aligned at Brewster's angle such as the windows on the laser tube or of other polarizing components in the resonator. The pulse duration is advantageously increased as described in the '526 application using neon in the gas mixture. A comparison of the $F_2$ laser emission linewidths in FIG. 1a with those shown at FIG. 1b illustrate the effect of increasing the pulse duration by substituting neon for helium in the gas mixture. However, when the laser tube windows are aligned at Brewster's angle, the output laser beam is still only about 70% polarized. It is desired to have a $F_2$ laser which emits a substantially polarized beam, e.g., such that the beam exhibits a 98% or greater polarization.

f. beam parameter and alignment monitoring

It is desired that the pulse energy, wavelength and bandwidth of the output beam each be stabilized at specified values, particularly for photolithography lasers. Moreover, it is desired to maintain a substantially constant energy dose at the workpiece. Further, it is desired to maintain a steady and predetermined beam alignment. Various techniques are known for monitoring the pulse energy and/or other beam parameters and controlling the discharge voltage, the composition of gases in the laser tube and/or the hardware and optics for stabilizing these parameters in photolithography lasers (see U.S. patent application Ser. Nos. 09/447,882, 60/124,785, 60/171,717, 09/418,052, 60/159,525, 09/416,344, 09/379,034, 60/127,062, 60/160,126 and 09/513,025, each of which is assigned to the same assignee as the present application and is hereby incorporated by reference. Beam alignment techniques are described at U.S. Pat. No. 6,014,206 and U.S. patent application Ser. No. 09/271,020, which are assigned to the same assignee as the present application, and U.S. Pat. No. 5,373,515, each of which is hereby incorporated by reference. The visible emission of the $F_2$ laser and the tendency of the VUV emission of the $F_2$ laser to undergo absorption present some difficulties when applying the techniques particularly set forth in these patents and patent applications. It is therefore desired to effectively implement beam alignment and parameter monitoring techniques in a $F_2$ laser system.

SUMMARY OF THE INVENTION

It is an object of the invention to provide an efficient $F_2$ laser for industrial, commercial and scientific applications such as photolithography and other materials processing applications.

It is also an object of the invention to provide improved line-selection techniques for the $F_2$ laser, and to provide a technique for monitoring the quality of the line selection being performed.

It is a further object of the invention to provide a $F_2$ laser having improved resonator efficiency.

It is another object of the invention to provide techniques for reducing the influence of the visible emission on the performance of the $F_2$ laser.

It is also an object of the invention to provide a $F_2$ laser that emits a substantially polarized beam, e.g., such that the beam exhibits a 98% or greater polarization.

It is a further object of the invention to effectively implement beam alignment and parameter monitoring techniques in a $F_2$ laser system.

It is an additional object of the invention to provide an excimer laser, such as a KrF or ArF excimer laser having an efficient line-narrowing optical resonator.

In accordance with the above objects, a $F_2$ laser in accord with the present invention includes a laser tube filled with a laser gas mixture and having a plurality of electrodes connected with a power supply circuit for energizing the gas mixture. A laser resonator including the tube for generating a 157 nm laser beam includes a line selection unit for selecting one of multiple closely-spaced characteristic emission lines around 157 nm.

In a first aspect of the invention, line selection is provided by a transmission diffraction grating. The preferred grating is made of $CaF_2$ and also serves to outcouple the laser beam.

The transmission grating in accord with the first aspect advantageously permits a straight, shortened and more efficient $F_2$ laser resonator.

In a second aspect of the invention, line selection is provided for a $F_2$ laser by a grism. The preferred grism also serves either to outcouple the beam or as a highly reflective resonator reflector. The grism in accord with the second aspect advantageously provides enhanced dispersion and efficiency.

Also in accord with this aspect of the invention, an excimer or molecular fluorine laser includes a laser output coupler including a grism, which is a combination of a prism and a grating. Such a combination of prism and grating within one element advantageously improves the resolving power of a single dispersive element and reduces the internal resonator losses by a minimum of optical interfaces.

The grism used directly as an output coupler for an excimer or molecular fluorine laser advantageously combines four different tasks in one element: partial reflection (or output coupling) for the resonator, dispersion and line narrowing or line selection, suppression of background radiation, such as amplified spontaneous emission (ASE) radiation (or a parasitic second line), and pointing stabilization of the selected line (wavelength). The grating-prism (or grism) may be designed in such a manner that it realizes a straight beam path for the selected wavelength which is used as the output beam for use with an application process, operating like a common mirror if the blaze angle of the grating is equal to the prism angle for the selected wavelength. Thus, the laser resonator can be very short even if it is containing a line selecting or line narrowing element having the direction of beam propagation in a straight line.

In a third aspect of the invention, line selection for an $F_2$ laser is fully performed at the front optics module of the laser resonator resulting in a more efficient resonator.

In a fourth aspect of the invention, a monitor grating and an array detector are provided for monitoring and controlling the intensity of the selected (and/or unselected) lines and for monitoring the stability of the selected wavelength. The quality of the line selection may be advantageously monitored.

In a fifth aspect of the invention, a $F_2$ laser system includes an energy detector provided in an enclosure purged with an inert gas at a slight, regulated overpressure. Advantages include reduced turbulence typically associated with high gas flow and a reduced rate of deposition of contaminants on optical surfaces. The fifth aspect may be advantageously combined with the fourth aspect.

In a sixth aspect of the invention, a blue or green reference beam (e.g., having a wavelength between 400 nm and 600 nm) is used for $F_2$ laser beam wavelength calibration and/or alignment stabilization. The blue or green reference beam advantageously is not reflected out with the red emission of the laser and is easily resolved from the red emission.

In a seventh aspect of the invention, the clearing ratio of the laser gas flow through the discharge area of a $F_2$ laser is improved. The reduced clearing time is provided by narrowing the discharge width using improved laser electrodes and/or by increasing the gas flow rate through the discharge while maintaining uniformity by using a more aerodynamic discharge chamber. $F_2$ laser operation at higher repetition rates is advantageously permitted by the reduced clearing ratio in accord with the seventh aspect of the invention.

In an eighth aspect of the invention, a $F_2$ laser is provided with a substantially polarized output beam. The polarization is provided by a thin film polarizer, a double reflection prism and/or Brewster windows. The polarization provided by the eighth aspect of the invention is advantageously 98% or better.

BRIEF DESCRIPTION OF THE DRAWINGS

FIG. 7a shows a reflective grating.

FIG. 7b shows a reflective grism.

FIG. 8 shows a grism designed for straight through selected line propagation.

FIG. 10b illustrates a spectral distribution and zero background radiation level of an output beam of the resonator configuration of FIG. 10a.

INCORPORATION BY REFERENCE

What follows is a cite list of references each of which is, in addition to those references cited above and below, and including that which is described in the related art description and in the priority section, and the above invention summary, and the abstract below, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below and within the scope of the present invention. Further patent, patent application and nonpatent references are cited in the written description and are also incorporated by reference into the detailed description of the preferred embodiment with the same effect as just described with respect to the following references:

German Utility Model No. 299 07 349 1;

U.S. Pat. Nos. 5,901,163, 5,856,991, 6,028,879, 5,559,816, 4,977,563, 4,611,270, 6,061,382, 5,406,571, 5,852,627, 3,609,856, 5,095,492 3,471,800, 3,546,622, 5,440,574, 6,014,206, 5,373,515, 6,128,323, and 5,479,431;

Japanese patents no. 8-274399, 2-152288, 60-16479, and 62-160783; and

U.S. patent application Ser. Nos. 60/178,445, 09/271,020, 09/317,527, 09/317,695, 09/130,277, 09/244,554, 09/454,803, 60/212,183, 09/657,396, 09/484,818, 09/599,130, 09/602,184, 09/453,670, 09/629,256, 60/173,993, 60/166,967, 60/170,919, 60/200,163, 60/215,933, 60/235,116, 60/140,532 and 60/140,531, each of which is assigned to the same assignee as the present application;

R. Hultzsch: Gitterprismen, Photonik (September 1998), p. 40;

W. Demtroder: Laser Spectroscopy Springer, Berlin Heidelberg (1996) p. 112; and

W. A. Taub: Constant Dispersion Grism Spectrometer for Channeled Spectra J. Opt. Soc. Am. A7 (1990) p. 1779.

DETAILED DESCRIPTION OF THE PREFERRED EMBODIMENTS

Figure 2:
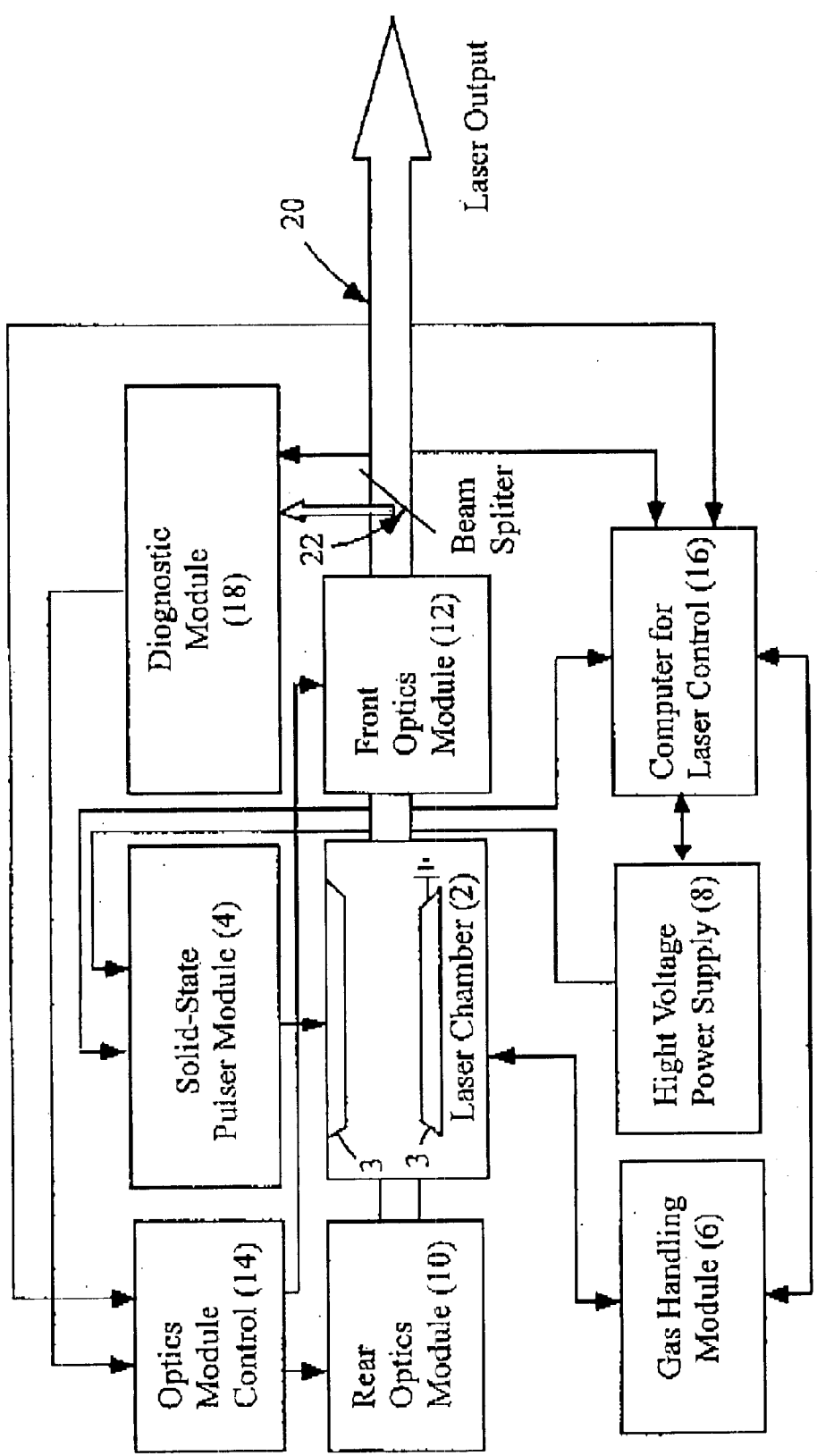
FIG. 2 schematically shows a $F_2$ laser system in accord with the present invention.

FIG. 2 schematically shows a $F_2$ laser system in accord with the present invention. The system includes a laser chamber 2 filled with a gas mixture and having a pair of main electrodes 3 and one or more preionization electrodes (not shown). The electrodes 3 are connected to a solid-state pulser module 4. A gas handling module 6 is connected to the laser chamber 2. A high voltage power supply 8 is connected to the pulser module 4. A laser resonator is shown surrounding the laser chamber and including a rear optics module 10 and a front optics module 12. An optics control module 14 communicates with the rear and front optics modules 10, 12. A computer or processor 16 control various aspects of the laser system. A diagnostic module 18 receives a portion of the output beam 20 from a beam splitter 22.

The gas mixture in the laser chamber 2 typically includes about 0.1% $F_2$ and 99.9% buffer gas. The buffer gas preferably comprises neon and may be a mixture of neon and helium (see the '526 application, mentioned above). A trace amount of a gas additive such as xenon, argon or krypton may be included (see U.S. patent applications Ser. Nos. 09/513,025 and 60/160,126, which are each assigned to the same assignee as the present application and are hereby incorporated by reference).

The gas mixture is preferably monitored and controlled using an expert system (see the '034 application, mentioned above, and U.S. Pat. No. 5,440,578, which is hereby incorporated by reference). One or more beam parameters indicative of the fluorine concentration in the gas mixture, which is subject to depletion, may be monitored, and the gas supply replenished accordingly (see the '882, '052, '525, '034, '717 and '062 applications, mentioned above). The diagnostic module 18 may include the appropriate monitoring equipment or a detector may be positioned to receive a beam portion split off from within the laser resonator (see the '052 and '130 applications, mentioned above; see also U.S. patent application No. 60/166,967, which is assigned to the same assignee as the present application and is hereby incorporated by reference). The processor 16 preferably receives information from the diagnostic module 18 concerning the halogen concentration and initiates gas replenishment action such as micro-halogen injections, mini and partial gas replacements, and pressure adjustments by communicating with the gas handling module 6.

Although not shown, the gas handling module 6 has a series of valves connected to gas containers external to the laser system. The gas handling module 6 may also include an internal gas supply such as a halogen and/or xenon supply or generator (see the '025 application). A gas compartment or (not shown) may be included in the gas handling module 6 for precise control of the micro halogen injections (see the '882 and '717 applications, mentioned above, and U.S. Pat. No. 5,396,514, which is assigned to the same assignee as the present application and is hereby incorporated by reference).

The wavelength and bandwidth of the output beam 20 are also preferably monitored and controlled. A preferred wavelength calibration apparatus and procedure are described at the '344 application, mentioned above, and at U.S. Pat. No. 4,905,243, which is hereby incorporated by reference. The monitoring equipment may be included in the diagnostic module 18 or the system may be configured to outcouple a beam portion elsewhere such as from the rear optics module, since only a small intensity beam portion is typically used for wavelength calibration (see the '344 application). The diagnostic module 18 may be integrated with the front optics module 12, and the line-narrowing components of the resonator may be integrated in the front optics module 12, as well, such that only a HR mirror and an optional aperture are included in the rear optics module 10 (see U.S. patent application no. not yet assigned, of Dr. Klaus Vogler and Dr.

Uwe Stamm, entitled, "Resonator for Single Line Selection", filed Nov. 22, 2000, which is assigned to the same assignee as the present application and is hereby incorporated by reference).

Preferred main electrodes 3 are described at U.S. patent application Ser. Nos. 60/128,227, 09/453,670 and 60/184, 705, which are each assigned to the same assignee as the present application and are hereby incorporated by reference. Other electrode configurations are set forth at U.S. Pat. Nos. 5,729,565 and 4,860,300, each of which is assigned to the same assignee and is hereby incorporated by reference. Preferred preionization units are set forth at U.S. patent application Ser. Nos. 60/162,845, 60/160,182 and 09/247, 887, each of which is assigned to the same assignee as the present application and is hereby incorporated by reference. The preferred solid state pulser module 4 and the high voltage power supply 8 are set forth at U.S. Pat. No. 6,020,723 and U.S. patent application Ser. Nos. 09/432,348, 08/842,578, 08/822,451, 60/149,392 and 09/390,146, each of which is assigned to the same assignee as the present application and is hereby incorporated by reference into the present application.

The resonator includes optics for line-selection and also preferably for narrowing the selected line (see U.S. patent application Ser. Nos. 09/317,695, 09/317,527, 09/657,396, 60/212,183, 09/599,130, 60/170,342, 60/166,967, 60/170, 919, 09/584,420, 60/212,257, 60/212,301, 60/215,933, 09/130,277, 09/244,554, 60/124,241, 60/140,532, 60/140, 531, 60/147,219, and 09/073,070, setting forth preferred line selection other than or in addition to that set forth in accord with the present invention, below, and U.S. Pat. Nos. 5,761, 236 and 5,946,337, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, all of which are hereby incorporated by reference). Some of the line selection and/or line narrowing techniques set forth in these patents and patent applications may be used in combination with or alternative to any of the aspects of the invention set forth below.

Also particularly for the molecular fluorine laser system, an enclosure (not shown) may seal the beam path of the beam 20 such as to keep the beam path free of photoabsorbing species. Smaller enclosures may seal the beam path between the chamber 2 and the optics modules 10 and 12. Advantageously, as mentioned below in accord with a preferred embodiment, the diagnostic components may be integrated into the front optics module 12, separate enclosure components that would otherwise be used between, e.g., a separate diagnostic module 18 and beam splitter module 22, or between the front optics module 12 and beam splitter module 22, would not be used. The preferred enclosure is described in detail in U.S. patent application Ser. Nos. 09/343,333, 09/598,552, 09/594,892, 09/131,580 and 60/140,530, each of which is assigned to the same assignee and is hereby incorporated by reference, and alternative configuration are set forth at U.S. Pat. Nos. 5,559,584, 5,221,823, 5,763,855, 5,811,753 and 4,616,908, all of which are hereby incorporated by reference.

Figure 3A:
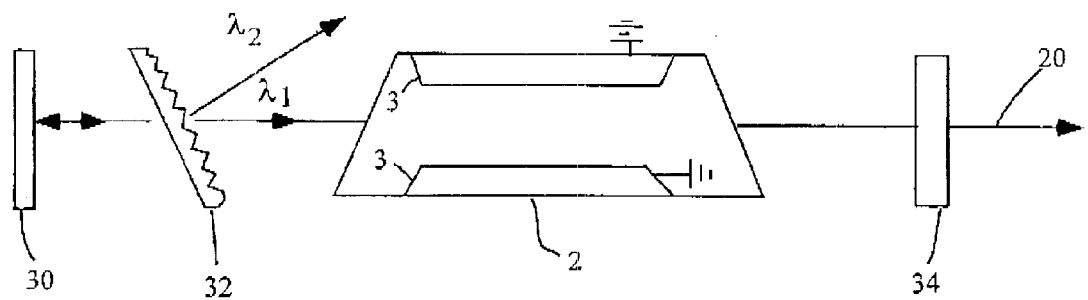
FIG. 3a schematically shows a $F_2$ laser resonator including a transmission diffraction grating for line selection in accord with the first aspect of the invention.

FIG. 3a schematically shows a $F_2$ laser resonator including a transmission diffraction grating 32 for line selection in accord with a first embodiment and the first aspect of the invention. The resonator includes the laser chamber 2 including electrodes 3, and is filled with a gas mixture, and also preferably includes a heat exchanger and fan for circulating the gas mixture, among other components not shown but which are known to those skilled in the art as being included with an excimer laser tube, such as baffle boxes and a precipitator for keeping the laser windows clean, preionization, aerodynamic components, etc., a highly reflective resonator reflector 30, a transmission diffraction grating 32 and an output coupler 34. The output coupler 34 may be replaced with a second highly reflective mirror and output coupling may be performed by polarization outcoupling from a tilted surface of a polarization beam splitter or a prism or other optical element in the resonator. This alternative outcoupling may be used with other aspects of the invention set forth below, as well.

Figure 1A:
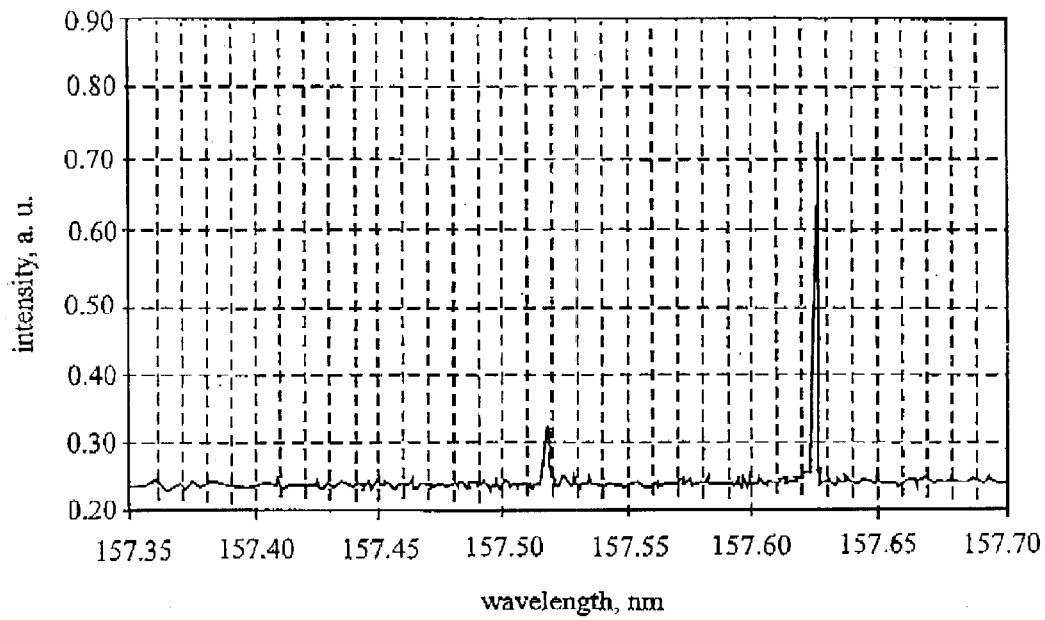
FIG. 1a shows the emission spectrum of a free-running $F_2$ laser with helium as the buffer gas.
Figure 1B:
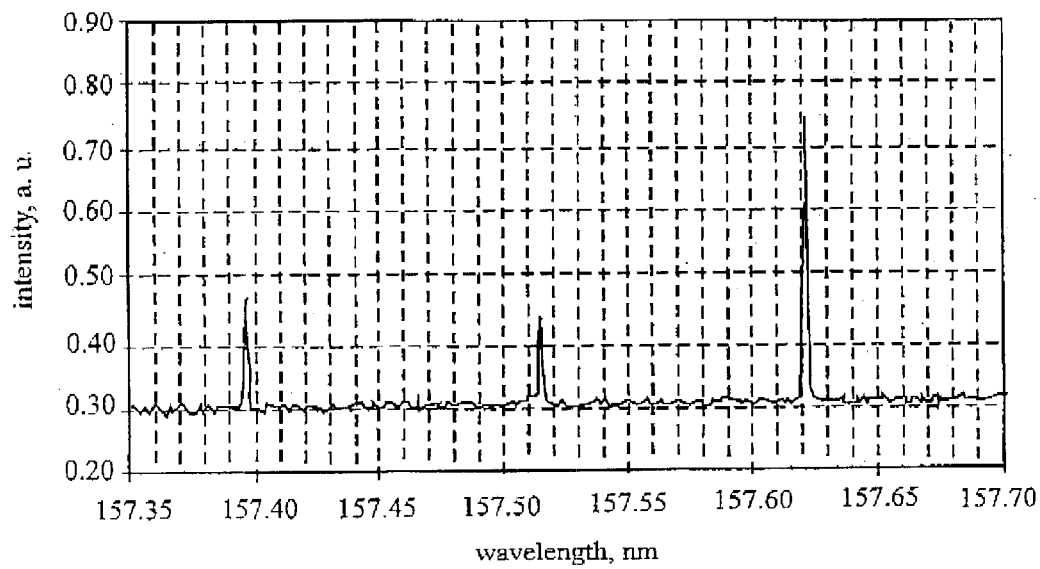
FIG. 1b shows the emission spectrum of a free-running $F_2$ laser with neon as a buffer gas.

The transmission grating 32 disperses the beam as it passes through. A single line (e.g., $\lambda_1$) of the characteristic plural emission lines of the $F_2$ laser (see FIGS. 1a and 1b) remains within the acceptance angle of the resonator and the other line or lines (e.g., including $\lambda_2$) is/are selected out, as illustrated. The grating 32 is aligned at the appropriate angle, as illustrated, so that the selected line $\lambda_1$ is centrally positioned within the acceptance angle of the resonator. Means for rotating the grating 32 may be included for performing the alignment online or otherwise. Although not shown, optics for narrowing the selected line $\lambda_1$ are preferably included in the laser resonator such as an etalon, one or more apertures and/or a prism or prisms (see the '527 and '396 applications, mentioned above).

Figure 3B:
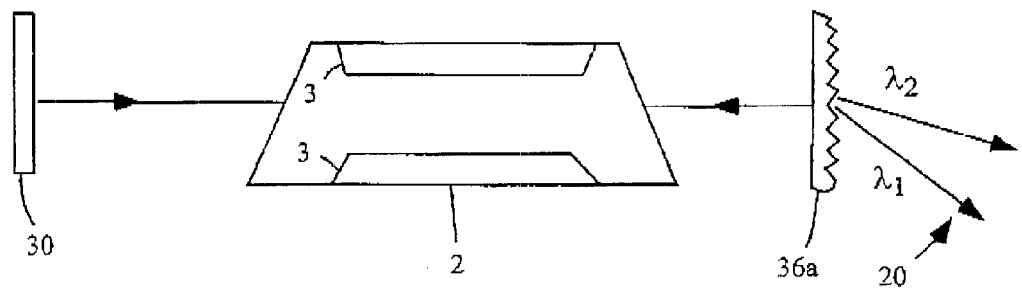
FIG. 3b schematically shows a $F_2$ laser resonator including a transmission diffraction grating as an output coupler also in accord with the first aspect of the invention.

FIG. 3b schematically shows a $F_2$ laser resonator including a transmission diffraction grating 36 as an output coupler in accord with a second embodiment and the first aspect of the invention. The grating 36a disperses the beam 20 such that the beam 20 including only the selected line $\lambda_1$ is used for industrial processing applications for which the laser is intended. Advantageously, visible (red) atomic fluorine emission is also filtered from the beam at the grating outcoupler 36a. The grating 36a also reflects a portion of the beam back into the gain medium. As such, the grating 36a performs the dual function of dispersing the beam 20 for line selection and outcoupling the laser beam 20 (and also filtering the red light).

The grating 36a may be configured as in FIG. 3b to have a partially reflective surface for reflecting light back into the gain medium, while only the light transmitted at the partially reflective surface is incident at the ruled or grating surface of the grating 36a. As such, the beam is dispersed and the primary line $\lambda_1$ around 157.62 nm is selected, while the secondary line $\lambda_2$ around 157.52 nm is dispersed away from the beam acceptance angle, after the beam is output coupled. In this way, the grating 36a serves as a spectral filter outside the laser resonator. Alternatively, the surface facing the chamber 2 may have an AR coating on it, and the ruled surface of the grating 36a is partially reflective, such that only the primary line $\lambda_1$ is reflected back into the chamber to be amplified by the gas mixture or gain medium.

Figure 3C:
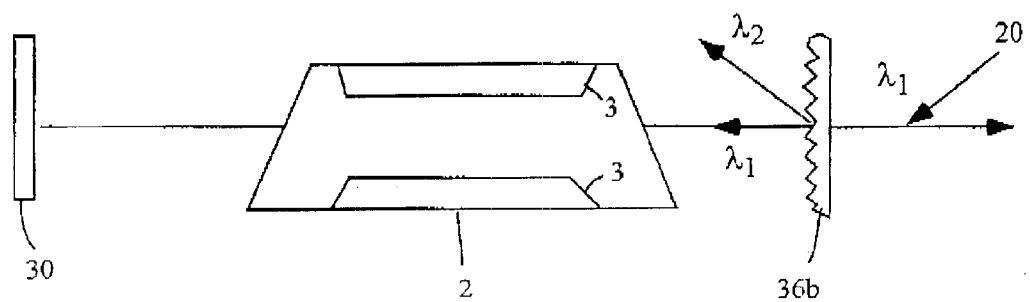
FIG. 3c schematically shows an alternative embodiment of a $F_2$ laser resonator including a transmission diffraction grating as an output coupler also in accord with the first aspect of the invention.

The grating 36b is a variation of the latter of the embodiments just described relating to the grating 36a. The grating 36b shown in FIG. 3c has a ruled or grating surface facing the discharge chamber 2. In this way, the unselected line $\lambda_2$ is dispersed away from the acceptance angle of the resonator and only the selected primary line $\lambda_1$ is reflected back into the chamber 2 for amplification by the gain medium. Preferably, the back surface away from the chamber 2 of the transmission grating 36b has an antireflective (AR) coating formed on it to reduce or prevent reflection from the back surface.

In the second embodiment, one optical element serves at least two functions, advantageously reducing the number of potentially lossy surfaces the beam encounters and reducing the overall size of the resonator. In addition, fewer optical components means greater simplicity for alignment and fewer optical components that may need to be replaced due to aging. Also, fewer surfaces means less wavefront distortions due to imperfections at those surfaces resulting in undesirable bandwidth broadening.

In either of the embodiments in accord with the first aspect of the invention shown in FIGS. 3a and 3b, the intensity of the unselected line $\lambda_2$ may be monitored by an energy detector positioned to receive the unselected line $\lambda_2$ after having been dispersed away from the acceptance angle of the beam that includes the primary line $\lambda_1$. The detected intensity of the unselected line $\lambda_2$ can provide information about the intensity of the selected line $\lambda_1$ or about the gas mixture or laser optics. Advantageously, with this feature, the beam including the selected line $\lambda_1$ does not encounter a beam splitter for reflecting a portion to an energy detector, because the unselected line is used for this purpose. A portion of the selected line $\lambda_1$ may be otherwise split off for another purpose such as for monitoring a spectral distribution of the beam 20, or the selected line $\lambda_1$ of the main beam 20 may be undisturbed on its way to application processing, while diagnostics are entirely performed using the unselected line $\lambda_2$. In either of the above embodiments, the material of the grating is at least substantially transparent to 157 nm radiation, and as such, calcium fluoride, barium fluoride, magnesium fluoride, strontium fluoride and lithium fluoride. In other embodiments described herein, transmissive optical components are preferably formed from one or more of these materials, and in some embodiments, it may be desired not to use magnesium fluoride due to its birefringent nature. In some cases, however, the birefringence of magnesium fluoride may be advantageously used (see U.S. patent application Ser. Nos. 60/212,257 and 09/317,695, each of which is assigned to the same assignee and is hereby incorporated by reference).

Figure 4A:
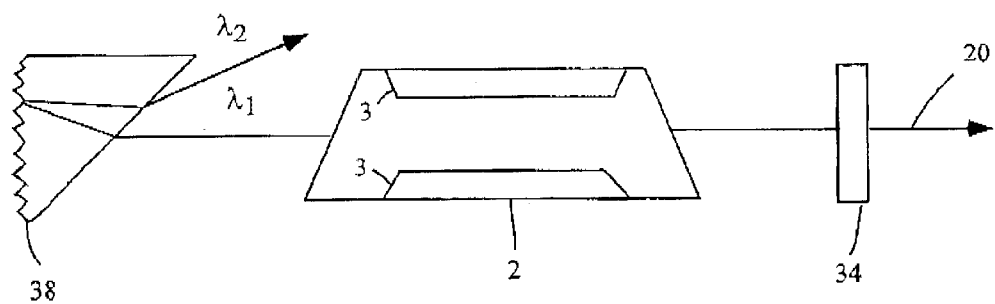
FIG. 4a schematically shows a $F_2$ laser resonator including a grism for line selection in accord with the second aspect of the invention.

FIG. 4a schematically shows a $F_2$ laser resonator including a grism 38 for line selection in accord with a third embodiment and a second aspect of the invention. The resonator includes a grism 38 and an outcoupler 34 on either side surrounding the laser chamber 2. The grism 38 is an integrated combination of a prism and a grating and advantageously provides improved line selection as a result. The grating and prism aspects of the grism 38 each provide dispersion, or the prism may be used solely to expand the beam to reduce divergence and utilize a larger surface area of the grating surface for improved grating performance, such that the dispersion of the grism 38 is enhanced over that of either a prism or grating alone.

The grating aspect of the grism 38 may serve to select the desired line $\lambda_1$ while the prism aspect of the grism 38 may serve to narrow the selected line. The prism aspect may serve to expand the beam to enhance the dispersion of the grating aspect, as well. The back surface of the grism 38 shown in FIG. 4a is highly reflective so that the grism 38 serves the additional function of a resonator reflector, and the advantages of reducing the number of optical components set forth above are also achieved. The grism 40 may also be oriented so that the grating surface is first encountered and the smooth back surface of the prism component provides the highly reflective surface to perform the resonator reflector function of the grism 38.

A HR mirror may be included after the grism, wherein no reflective coating would be applied to the grism surfaces, and in this embodiment, AR coating would be preferably applied to the grism surfaces. In either case, with or without the HR mirror, the entrance surface of the grism closest to the laser tube 2 preferably includes an AR coating thereon.

Figure 4B:
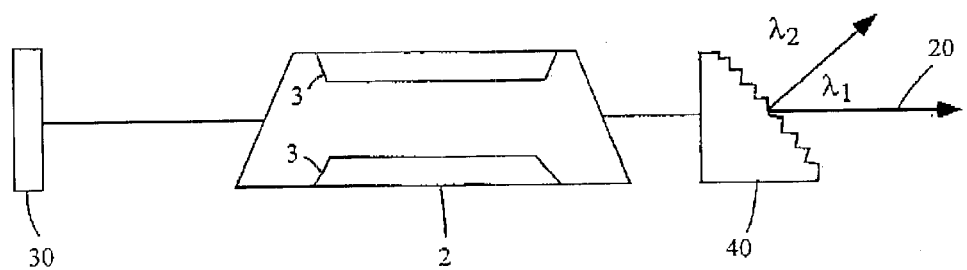
FIG. 4b schematically shows a $F_2$ laser resonator including a grism as an output coupler also in accord with the second aspect of the invention.

FIG. 4b schematically shows a $F_2$ laser resonator including a grism 40 as an output coupler in accord with a fourth embodiment and the second aspect of the invention. The grism 40 shown at FIG. 4b serves the multiple functions of line selection, line narrowing and output coupling, with advantageous reduction in the number of optical components typically used for providing all of these functions. The grism 40 preferably has a partially reflecting surface at the surface of the prism component away from the grating to perform the function of an output coupling resonator reflector. The grism 40 may also be oriented so that the grating surface provides the partially reflecting surface and the beam ultimately exits at the smooth prism side of the grism 40. Also, the grism 40 may be oriented as in FIG. 4b, and differ from the preferred arrangement described above in that an AR coating may be applied to the smooth prism surface closest to the discharge chamber 2, and the grating surface may serve as the partially reflecting resonator reflector surface. In any of these alternative configurations, advantageously, red atomic fluorine emission is also filtered at the grism outcoupler 40, and the unselected line (e.g., the secondary line around 157.52 nm) may be used for diagnostic purposes as described above with respect to FIG. 3b.

The grating portion of either of the grisms 38, 40 set forth above may be on the surface of the prism material or may be etched into the prism material such as by ion beam etching (see U.S. patent application No. 60/167,835, which is assigned to the same assignee and is hereby incorporated by reference). These two grism configurations are discussed by R. Hultzsch, "Gitterprismen", Photonik, p. 40 (September 1998), which is hereby incorporated by reference. Additional grism discussions are set forth at the U.S. patent application Ser. Nos. 09/602,184 and 60/140,532, assigned to the same assignee as the present application, and U.S. Pat. Nos. 5,625,499 and 5,652,681, each of which is hereby incorporated by reference.

The grism 40 as an output coupler is also preferably used with a KrF excimer laser and with an ArF excimer laser. In order to achieve an alternative resonator configuration without the grism 40 with comparable dispersive power to the resonator having the grism 40 as an output coupler according to a preferred embodiment, a very large angle prism, two or more prisms or a high dispersive grating may be used. However, all of these alternatives introduce high losses for the laser radiation bouncing back and forth within the resonator. This tends to worsen the ratio between broadband background radiation and the selected line or narrow band emission. In addition, to perform line selection or line narrowing with sufficient angular dispersion, the resonator would be bent or elongated. This causes additional power losses. Besides the dispersive elements, resonator mirrors and beam steering mirrors would likely be used. This makes resonator alignment using a pilot or reference laser more difficult.

Figure 5:
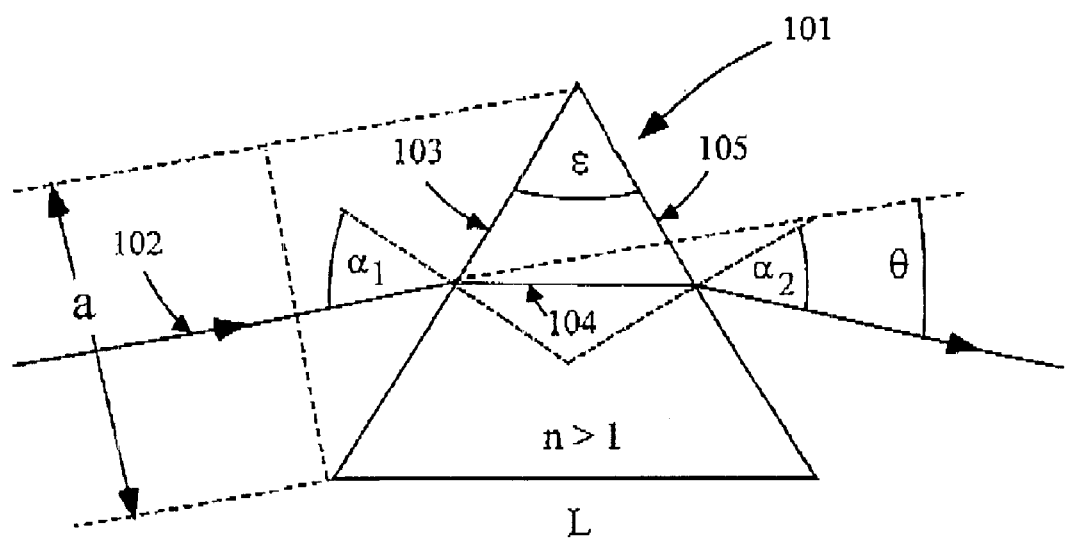
FIG. 5 illustrates angular dispersion by an ordinary prism.

A brief discussion of dispersion by an ordinary prism is discussed here to illustrate the advantages of using the grism 40 as an output coupler or otherwise in a preferred excimer or molecular fluorine laser which is described further below. FIG. 5 shows a dispersive prism 101 illustrating its angular dispersive properties. In FIG. 5, the following reference characters are used:

$\epsilon$: prism apex angle
$\alpha_1$: angle of incidence
$\alpha_1$: output reflection angle a: beam dimension n: refractive index of the prism L: length of the basis Θ: angle of beam deflection.

An incident chief ray 102 is shown in bold while outer or marginal rays of an incident laser beam are shown by dashed lines. The incident chief ray impinges upon an incidence surface 103 of the prism 101 at an incident angle $\alpha_1$ whereupon the ray 102 is refracted based on the Snell's relation. Since, the index of refraction n of the prism material is wavelength dependent, the angle of refraction differs depending on the wavelength producing dispersion of the wavelengths of the incident ray 102. The refracted ray 104 is then incident at an exit surface 105 of the prism 101 and is again refracted at an angle depending on its wavelength producing an exit ray 105 deviated from its incident direction, or the direction of the incident ray 102 by an angle Θ. For minimum deviation:

$$\alpha_1 = \alpha_2 = \alpha;$$

and $$\Theta = 2\alpha - \epsilon$$

The angular dispersion of the incident beam illustrated by the chief ray 102 is given by:

$$d\Theta/d\lambda = (d\Theta/dn)(dn/d\lambda) \quad (a),$$

and $$d\Theta/d\lambda = [2 \sin(\epsilon/2)/(1-n^2 \sin^2(\epsilon/2))^{1/2}](dn/d\lambda) \quad (b)$$

Figure 6A:
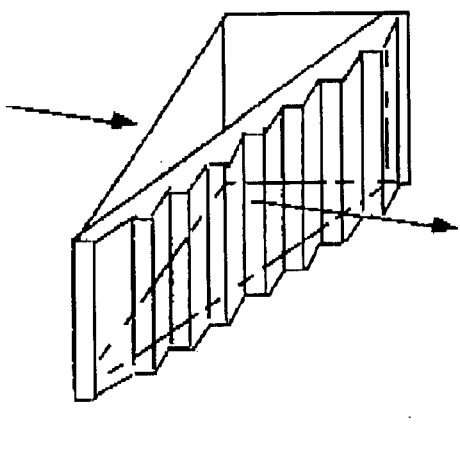
FIG. 6a illustrates a grism including a prism with an attached grating.
Figure 6B:
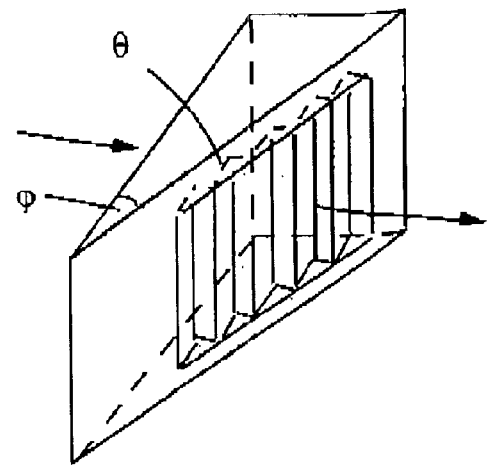
FIG. 6b illustrates a grism including a prism having a grating etched into the prism material.

FIGS. 6a and 6b ilustrate two alternatively preferred prism-grating or grism configurations. FIG. 6a shows a grism wherein the grating is attached to the back face of a prism. FIG. 6b shows a grism wherein the grating is engraved or etched into the solid material.

The material of the grisms of either FIG. 6a or 6b may be glass, fused silica, $CaF_2$, $BaF_2$, $MgF_2$ or another similarly transmissive optical material, adapted to the special wavelength of interest. For excimer lasers and especially the molecular fluorine laser ($F_2$-laser) emitting near 157 nm, $CaF_2$, $BaF_2$, $MgF_2$, and LiF, are possible materials, where $CaF_2$ is the preferred material for λ<200 nm such as for ArF lasers emitting around 193 nm and for the $F_2$ laser emitting around 157 nm.

FIGS. 7a–7b shows a comparison of actions of a reflective grating (FIG. 7a) and a grism (FIG. 7b) as wavelength selective retroreflectors. For the reflective Littrow grating of FIG. 7a:

α=blaze angle; and

Θ=angle of incidence

A maximum reflectivity is achieved for wavelengths satisfying the reflection relation:

$$\alpha = \Theta;$$

where, $$\lambda_0 = (2d/m)\sin \Theta \quad (4)$$

d=grating constant m=diffraction order.

For a reflective grism, as in FIG. 7b, where an incident ray is refracted at an incidence surface 108, propagates through the prism material 110 of the grism, and reflects from a back grating surface 112 of the grism, a maximum reflectivity is also achieved at a certain wavelength $\lambda_0$. Moreover, a bandwidth of the retroreflected beam is reduced by the dispersive powers of both the prism 110 and the grating 112 components of the grism, such that a spectral range that remains within the acceptance angle of the resonator upon reflection is greatly reduced. That is, the dispersion from the grism is a combined action between a pre-dispersion produced by a prism 110 (including beam expansion of the spectral range not dispersed from the acceptance angle of the resonator) and the grating surface 112.

FIG. 8 schematically illustrates a grating-prism (grism) including a prism 114 and an attached or etched in grating 116 designed to achieve a straight-through chief ray path for a selected wavelength. As shown in FIG. 8:

φ=prism apex angle;

Θ=blaze angle of the grating 116 (wherein, note that the grating 116 may be attached (as shown) or cut or etched into the original prism 114);

α, β=the angles of incidence and refraction with respect to a normal to the grating 116, respectively;

n, $n_E$, n'=refractive indices of the prism material 114, grating 116 at ambient atmosphere and air, respectively, wherein the material of the prism 114 may the same as the material of the grating 116, e.g, $CaF_2$ may be used for both, such that n=$n_E$.

To achieve a straight through beam path:

$$\alpha = -\beta = \phi;$$

and $$\phi = \Theta \quad (2)$$

As for the wavelength:

$$\lambda_0 = (d/m)(n-1)\sin \phi \quad (2a)$$

and the angular dispersion may be written as:

$$d\Theta/d\lambda = m/d(n-1)\cos \Theta \quad (3)$$

$$d\Theta/d\lambda = (1/\lambda)\tan \lambda \quad (3a)$$

FIGS. 9a–9c and 9f schematically illustrates dispersive resonators for line narrowing or line selection that do not include the grism of this preferred embodiment. FIGS. 9d–9f and 9g illustrate the relative respectively narrowed bandwidths of a beam 205 output from the resonators illustrated at FIGS. 9a–9c and 9h.

Figure 9A:
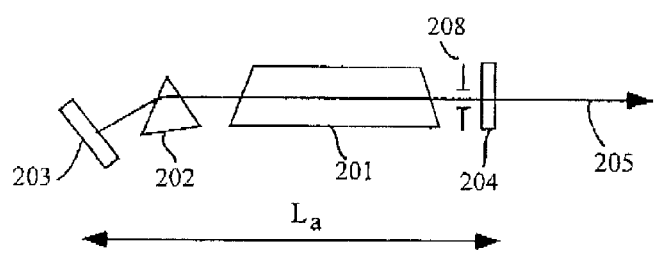
FIGS. 9a–9c and 9g show alternative line-narrowing resonator configurations.
Figure 9D:
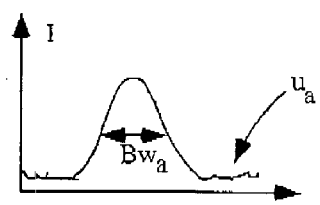
FIGS. 9d–9f and 9h illustrate spectral distributions and background radiation levels of output beams of the resonator configurations of FIGS. 9a–9c and 9g.

FIG. 9a shows a semi-narrow band resonator including a discharge chamber 201, a dispersive prism 202, a highly reflective mirror 203 and an outcoupler 204, and including an intracavity aperture 208, for producing a output beam 205. FIG. 9d illustrates a bandwidth $BW_a$ and a background radiation level $U_a$ of the output beam 205 of FIG. 9a. The background radiation level $U_a$ is not suppressed by the prism 202 located on the opposite end of the resonator from the outcoupler 204. The length of the resonator is shown as $L_a$.

Figure 9B:
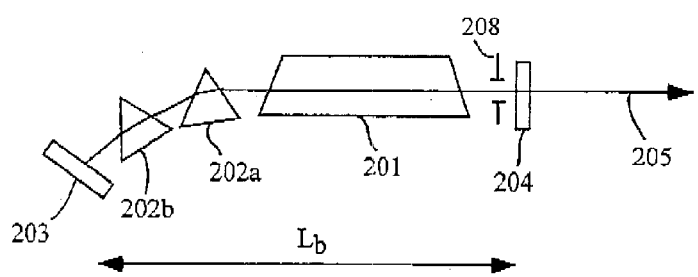
Figure 9E:
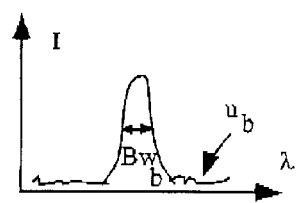

FIG. 9b shows a narrow band or semi-narrow band resonator including a discharge chamber 201, a pair of dispersive prisms 202a and 202b, an HR mirror 203 and an output coupler 204, and including an intracavity aperture 208, for producing a narrow or semi-narrow output beam. FIG. 9e illustrates a bandwidth $BW_b$ and a background radiation level $U_b$ of the output beam 205 of FIG. 9b. Again, the background radiation level $U_b$ is not suppressed by the prisms 202a, 202b located on the opposite end of the resonator from the outcoupler 204. The length of the resonator is shown as $L_b$.

Figure 9C:
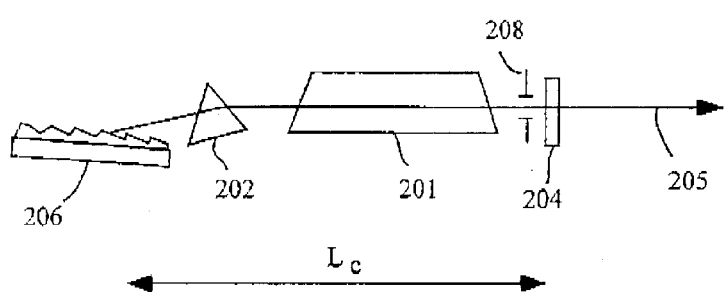
Figure 9F:
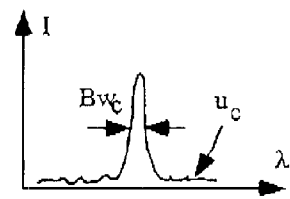

FIG. 9c shows a narrow band resonator including a discharge chamber 201, a dispersive prism or a beam expanding prism 212 (a prism beam expander may include more than one prism), and an outcoupler 204, and including an intracavity aperture 208, for producing a narrow-band output beam 205. FIG. 9f illustrates a bandwidth $BW_c$ and a background radiation level $U_c$ of the output beam 205 of FIG. 9c. Again, the background radiation level $U_c$ is not suppressed by the prism or prisms 212a, nor the grating 206 each located on the opposite end of the resonator from the outcoupler 204. The length of the resonator is shown as $L_c$.

Figures 9G, 9H:
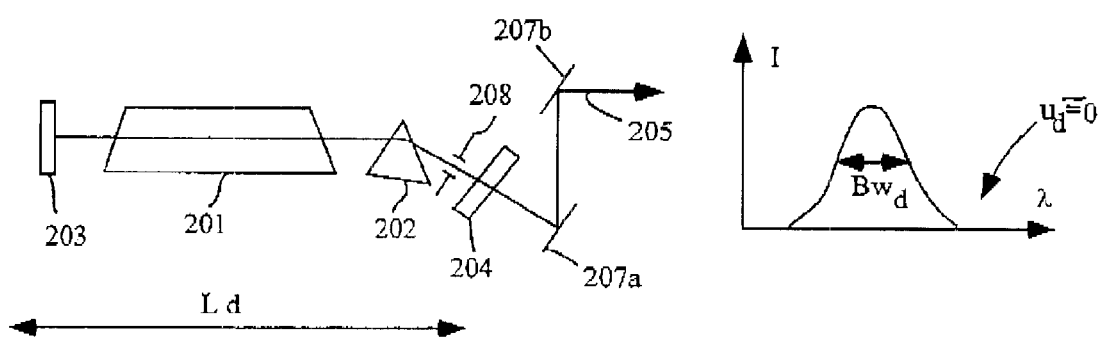

FIG. 9g shows a semi-narrow band resonator including a discharge chamber 201, a dispersive prism 202, an HR mirror 203 and an outcoupler 204, and including an intracavity aperture, for producing a semi-narrow-band output beam 205. FIG. 9h illustrates a bandwidth $BW_d$ and a background radiation level $U_d$ of the output beam 205 of FIG. 9g. In this case, the background radiation level $U_d$ is substantially reduced, and is nearly zero, due to its being dispersed by the prism 202 before passing through the output coupler 204. The prism 202 is advantageously disposed on the output coupling end of the resonator to achieve this suppression of the background radiation. This feature is described in more detail below with reference to FIG. 11. The length of the resonator is shown as $L_d$.

Also shown in FIG. 9g are a pair of steering mirrors 207a and 207b. The prism 202 bends the beam, as shown. The steering mirrors are arranged to bring the beam 205 back to parallel or possibly coaxial with the intracavity beam direction to the left of the prism 202 in FIG. 9g.

Figure 10A:
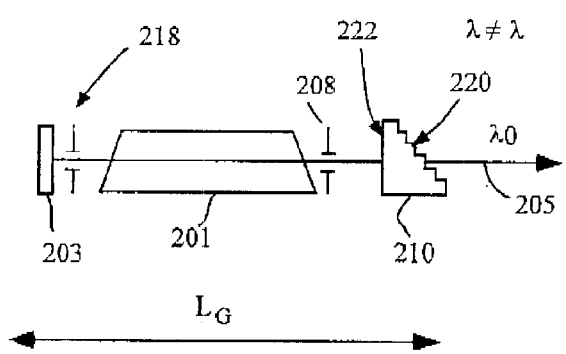
FIG. 10a shows a resonator including a grism output coupler.
Figure 10B:
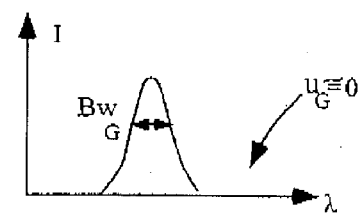

FIG. 10a shows a narrow band resonator including a discharge chamber 201, a grism outcoupler 210, an HR mirror 203 and a pair of intracavity apertures 208 and 218 for producing a narrow-band output beam 205. FIG. 10b illustrates a bandwidth $BW_d$ and a background radiation level $U_d$ of the output beam 205 of FIG. 10a. In this case, the background radiation level $U_G$ is substantially reduced, and is nearly zero, due to its being dispersed by the grism output coupler 210 as it is outcoupled from the laser resonator. It is preferred that the grating surface 220 of the grism 210 be partially reflecting such that the beam is dispersed before travelling back through the discharge chamber 201 for further amplification. The grism 210 is advantageously disposed on the output coupling end of the resonator to achieve this suppression of the background radiation.

In addition, the presence of the grating surface 220 of the grism 210, which is not present in the embodiment of FIG. 9g, advantageously produces narrow-band line-selection, and not merely semi-narrow band line selection. This is particularly advantageous when the laser is a broadband emitter such as an ArF or KrF laser. Improved line-selection of a single line of multiple lines around 157 nm and suppression of the visible emission of the molecular fluorine laser are also achieved. The length of the resonator is shown as $L_G$.

The grism 210 may be rotated for tuning the line-narrowed laser. In this case, the straight ahead beam propagation feature may be somewhat altered, but the beam propagation would not be bent substantially, such that the beam propagation would remain substantially or significantly straight, yielding an advantage over purely bent resonator configurations.

Some advantages are clearly realized with the resonator configuration of FIG. 10a. For the resonator lengths $L_a$–$L_c$ and $L_G$ of the resonators of FIGS. 9a–9c and FIG. 10a, below, the following relation is observed (using identical or substantially similar components, e.g., discharge chamber 201 and so on):

$$L_G << L_a \approx L_b \leq L_c \tag{4}$$

The shorter resonator length can be used to achieve a more compact laser. Losses are also reduced with the shorter resonator, which is particularly advantageous for the molecular fluorine laser.

There is also the advantage of reducing the spectral bandwidth:

$$BW_a \approx BW_d > BW_b \approx BW_G > BW_c \tag{5}$$

An additional prism or other optic may be disposed before the grism 210 to bring the degree of line-narrowing achieved with the configuration of FIG. 10a closer to that achieved with the Littrow grating configuration of FIG. 9c.

The effective suppression of the broadband background radiation:

$$U_a \approx U_b \approx U_c >> U_d \approx U_G \tag{6}$$

is also favorable for the grism output coupler resonator design.

Considering the properties as compared in the relations (4) to (6) illustrate that the resonator design of FIG. 10a with the grism output coupler 210 is a very suitable and convenient solution optimized for at least semi-narrow band spectral emission. The design of FIG. 10a may be used with additional optics to achieve a narrow band output beam (e.g., less than 0.6 pm) by inserting one or more additional optics such as a prism before the output coupling grism 210, and while still achieving a shorter resonator.

Considering the dispersive power of the resonator of FIG. 10a, the increase of the dispersive power of a grism over that provided by only the dispersive prism 202, e.g., as shown in FIG. 9g, to a value similar to that provided by the high dispersive grating in Littrow mount shown in FIG. 9c can be demonstrated by using the relevant equations and calculating the angular dispersion.

The greater the angular dispersion, the stronger is the dispersive power. Therefore, the effect of line narrowing or efficiency of line selection (or suppression of a second line nearby the selected one for the molecular fluorine laser) is advantageously improved.

For otherwise identical values such as prism apex angle, refractive index and angle of incidence, the angular dispersion, e.g., for the primary line $\lambda=157.6299$ nm of the multiple lines around 157 nm for the molecular fluorine laser (wherein a single element is used in each case) is estimated as follows, wherein $CaF_2$ is assumed to be the refractive material:

Beginning with using equation (1), above, from the discussion relating to FIG. 5, $d\Theta/d\lambda$ for the prism 202 is calculated as $$d\Theta/d\lambda = 2.48 \times 10^{-3} \text{ mrad/pm.}$$

For $CaF_2$, n (at 157.63 nm)=1.5587, and $dn/d\lambda$(157 nm)=−0.002605/nm and the prism apex angle $\epsilon$−45°, and the angle of incidence is equivalent to the blaze angle as used above.

For a Littrow grating, using equation (4), $$d\Theta/d\lambda = 6.34 \times 10^{-3} \text{ mrad/pm, and } \lambda = (2d/m)\sin\Theta, \text{ as usual.}$$

For a grism, using equation (3), $$d\Theta/d\lambda = 6.34 \times 10^{-3} \text{ mrad/pm};$$

$$d\lambda/d\Theta = (2d/m)\cos\Theta = \lambda/\sin\Theta;$$

and $$\cos\Theta = \lambda/\tan\Theta$$

wherein, $\lambda_0 = 157.6299$ nm is the selected wavelength, $\Theta = 45°$ is the angle of incidence. In addition, with $CaF_2$ being the same materials described above, and $\phi = \Theta$ such that the prism angle $\phi$ of FIG. 8 is equal to the blaze angle $\Theta$, a straight through beam path is realized through the grism output coupler 210 as shown in FIG. 10a.

In brief, using a grism 40 as an output coupler (see FIGS. 10a–10b) provides at least the following advantages over alternative resonator designs, such as those shown at FIGS. 9a–9c and 9g:

1. There is an increase of the dispersive power when only one element, i.e., a grism 210, is used, or an increase of the dispersive power of one element, i.e., the grism 210, of two or more of a line-narrowed resonator.
2. There is a reduction of resonator losses by using only one element, or by combining two elements in one, wherein fewer lossy optical interfaces are within the resonator. The reduced resonator size may also contribute to additional reduction in losses by absorption.
3. A very short resonator is provided, due to the presence of the grism 210, which combines both line selection and output coupling functions in one element, wherein preferably no coating is used with the grism 210 such as may be used with an outcoupling mirror.
4. A straight ahead beam propagation is achieved for the one selected wavelength which fulfills the straight-through path equation for the given grism 210 (see equation 2).
5. Because the grism 210 is located at the output side of the laser resonator, the grism 210 suppresses any parasitic background or second line emission, which is generated in the last resonator round trip, very efficiently.
6. Resonator adjustment by a pilot or reference laser is facilitated which does not transmit an oblique prism.

The resonator with the grism output coupler 210 has a same or substantially a same dispersive power as a blazed grating in Littrow configuration and about a factor of 2.5 higher dispersive power as a prism with the same prism angle. To achieve a comparable dispersion with usual prisms, at least a second prism is used to increase the dispersion effect by a factor of 2. A similarly compact resonator, however, as achieved with the grism output coupler 210 of FIG. 10a is not present with such a multiple prism configuration.

Figure 11:
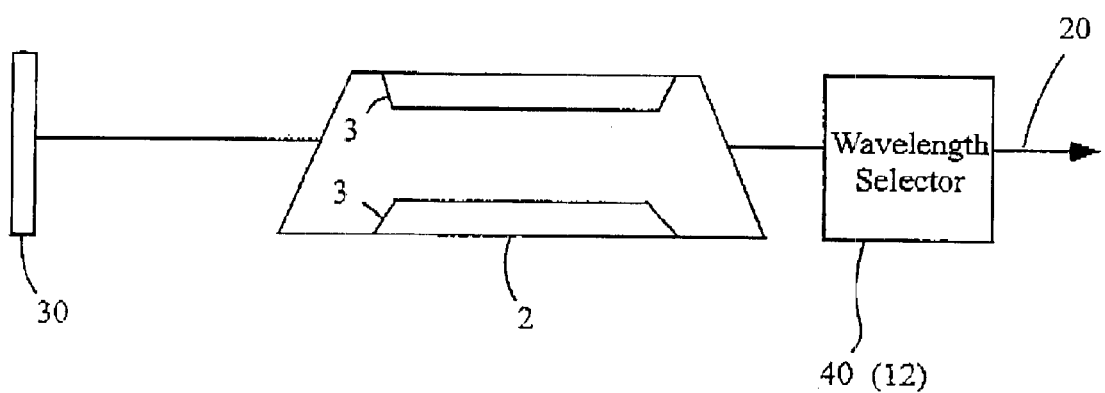
FIG. 11 schematically shows a $F_2$ laser resonator having line selection fully performed at the front optics module of the resonator in accord with the third aspect of the invention.

FIG. 11 schematically shows a $F_2$ laser resonator having line selection fully performed at the front optics module 12 of the resonator in accord with the third aspect of the invention. The wavelength selector 40 is schematically illustrated as fully integrated with the front optics module 12 in FIG. 11. The wavelength selector 40 may include any of the line selection techniques discussed herein (see FIGS. 3b and 4b) or in the patents and patent applications set forth above. Optics of the wavelength selector may include one or etalons and/or prisms, a grating, a birefringent plate (see the '695 application), a grism, etc. The resonator is advantageously simplified and may be shortened. For example, the highly reflective mirror 30 may be brought closer to the laser chamber 2 than if additional optics were included with the rear optics module including the mirror 30. The highly reflective mirror may even be a window of the laser chamber 2. Also optics control and beam monitoring can each take place around the front optics module permitting some versatility in overall laser system and housing design.

The beam is advantageously output coupled on a same side of the discharge chamber 2 as the line selection is performed in this embodiment. Preferably, the line-selection occurs prior to output coupling, such that radiation emanating directly from the discharge chamber is line-selected and/or line-narrowed prior to being output coupled, thus improving spectral purity (for alternative embodiments according to this feature, see U.S. patent application No. 60/166,967, which is assigned to the same assignee and is hereby incorporated by reference). The output coupler itself may perform line selection, e.g., using an outcoupling prism, grating, grism, birefringent prism or crystal (see below and U.S. patent application No. 60/212,257, which is assigned to the same assignee and is hereby incorporated by reference), or an output coupling interferometer (see U.S. patent application serial no. not yet assigned, of Kleinschmidt and Lokai, for "Narrow Band Excimer or Molecular Fluorine Laser Having an Output Coupling Interferometer", filed Nov. 17, 2000, which is assigned to the same assignee and is hereby incorporated by reference). Diagnostic tools may be included in a same front optics module with the output coupler/line-selection optic or optics, such as any of those shown at FIGS. 6a through 8b, or other tools for monitoring the pulse energy, beam power, wavelength, bandwidth, spatial or temporal pulse shape, amplified spontaneous emission (ASE), discharge width, breakdown voltage, other parameters indicative of the fluorine concentration in the tube, etc.

Figure 12A:
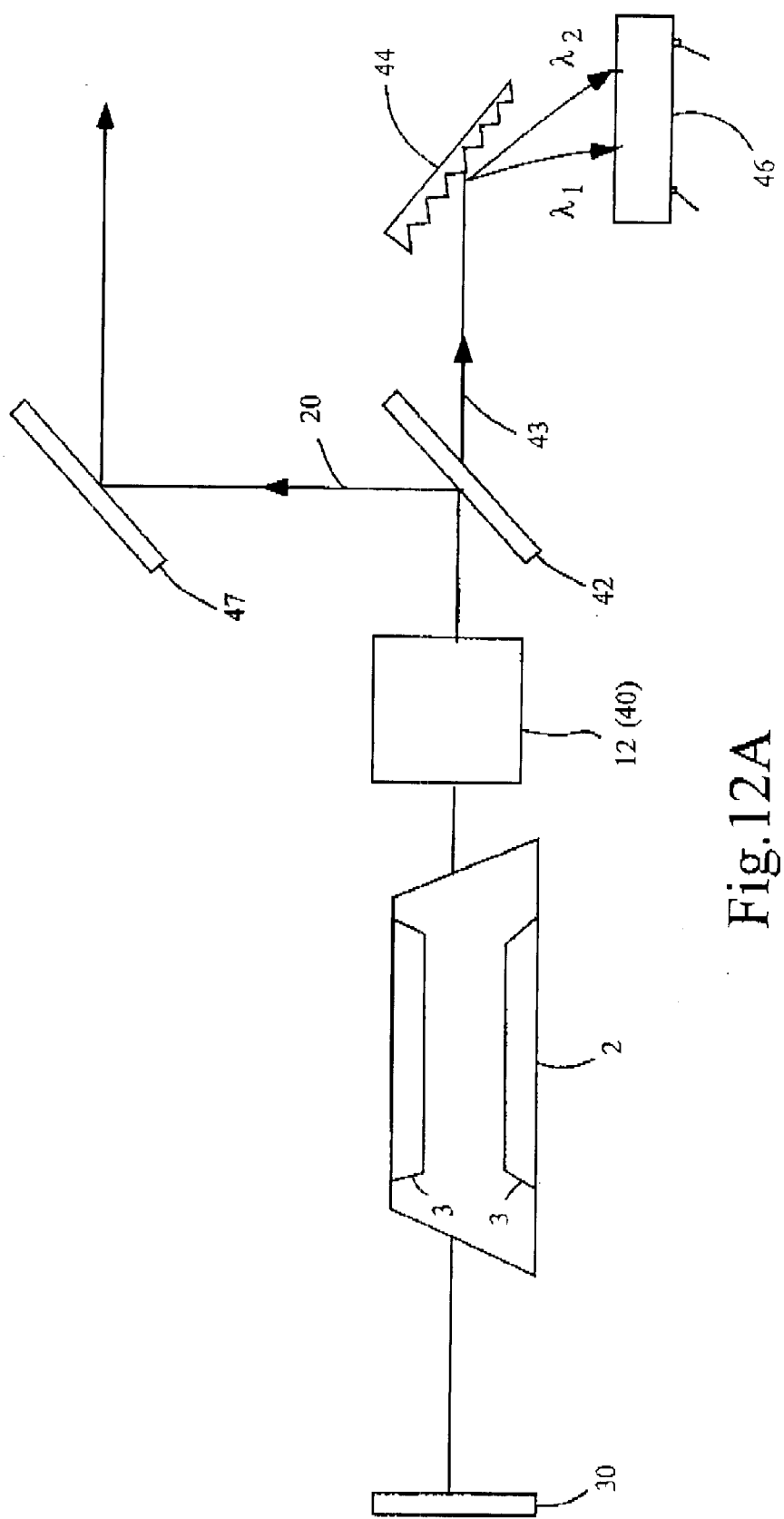
FIG. 12a schematically shows a $F_2$ laser system with a monitor grating and array detector in accord with the fourth aspect of the invention.

FIG. 12a schematically shows a $F_2$ laser system with a monitor grating 44 and array detector 46 in accord with a fifth embodiment and the fourth aspect of the invention. The beam 20 is outcoupled from the front optics module 12 and impinges upon a highly reflective or substantially reflective mirror 42. The highly reflective mirror typically has a reflectivity around 96%. The beam 20 is reflected from the HR mirror 42 and continues on to the industrial application for which it was intended, preferably first being redirected by another HR mirror 47. Although not shown, a reference beam may be provided behind the mirror 47 for propagating collinear with the beam 20 for controlling an alignment of the beam 20 (see the '967 application).

The beam portion 43 that passes through the HR mirror 42 next encounters a grating 44. In FIG. 12a, the grating 44 is a reflection grating, but a configuration using a transmission grating also may be used. Also, another dispersive element such as a prism or grism may be used rather than the preferred reflection grating 44, and the grating is preferred due to its high dispersive power over the prism and its simplicity relative to the grism. The beam portion 43 is dispersed by the grating 44 and the dispersed components of the beam portion 43 are detected at an array detector 46, such as a CCD array 46.

The intensities of each of the selected line $\lambda_1$ and the unselected line $\lambda_2$ are separately monitored at the CCD array. If the line selection (shown here performed at the front optics module 12, although any of the above described techniques or those set forth in any of the patents or patent applications referred to above may be used in some embodiments) is performed optimally, then the intensity of the unselected line $\lambda_2$ will be very small, and ideally zero. However, if the intensity of the unselected line is above the intensity that is expected, then the wavelength selector may not be optimally aligned, or a component may not be performing optimally. Thus, the performance of the wavelength selector can be advantageously monitored in accord with the fourth aspect of the invention. The divergence of the wavelength selector may also be monitored by monitoring the beam profile with an array detector (wherein a grating is not before the detector).

Depending on the intensity information received, the optics of the wavelength selector may be adjusted in a feedback arrangement to minimize the intensity of the unselected line $\lambda_2$, or to maximize the ratio of the intensities of the selected and unselected lines $\lambda_1/\lambda_2$. The intensity of the selected line or both lines may be monitored and the driving voltage may be controlled for stabilizing the energy of the beam 20, or the gas mixture may be adjusted to stabilize various beam parameters, based on the intensities detected.

Figure 12B:
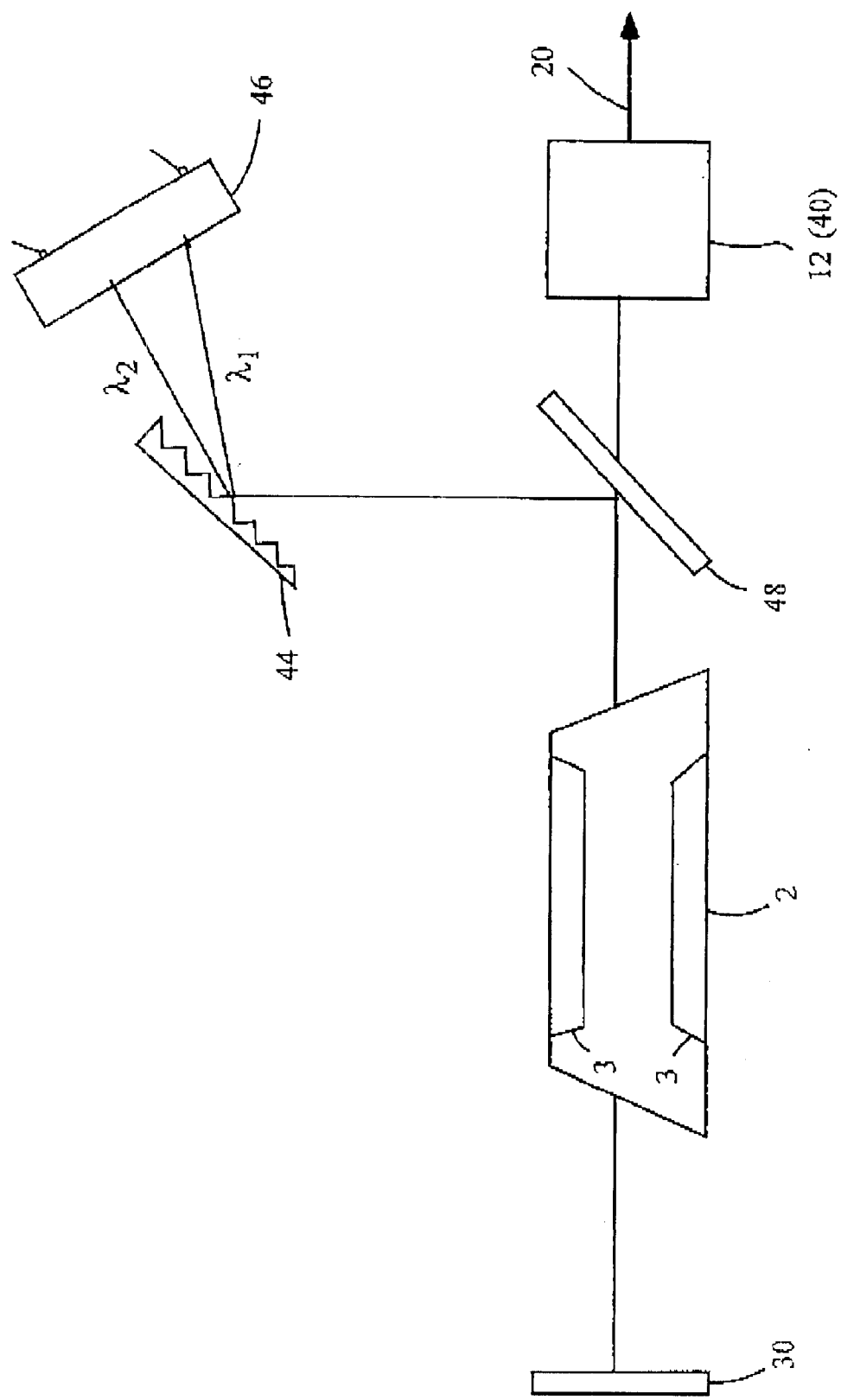
FIG. 12b schematically shows a $F_2$ laser system with a monitor grating and array detector also in accord with the fourth aspect of the invention.

FIG. 12b schematically shows a $F_2$ laser system with a monitor grating 44 and array detector 46 also in accord with a sixth embodiment and the fourth aspect of the invention. In contrast with the arrangement set forth at FIG. 12a, a beam splitter 48 is provided between the laser chamber 2 and the front optics module 12 for reflecting a portion of the beam toward the monitor grating 44. The beam 20 is advantageously outcoupled directly to its destination. The beam splitter 48 can be a polarizing element (as a Brewster surface or thin film polarizer) to improve the degree of polarization of the output beam.

Figure 13:
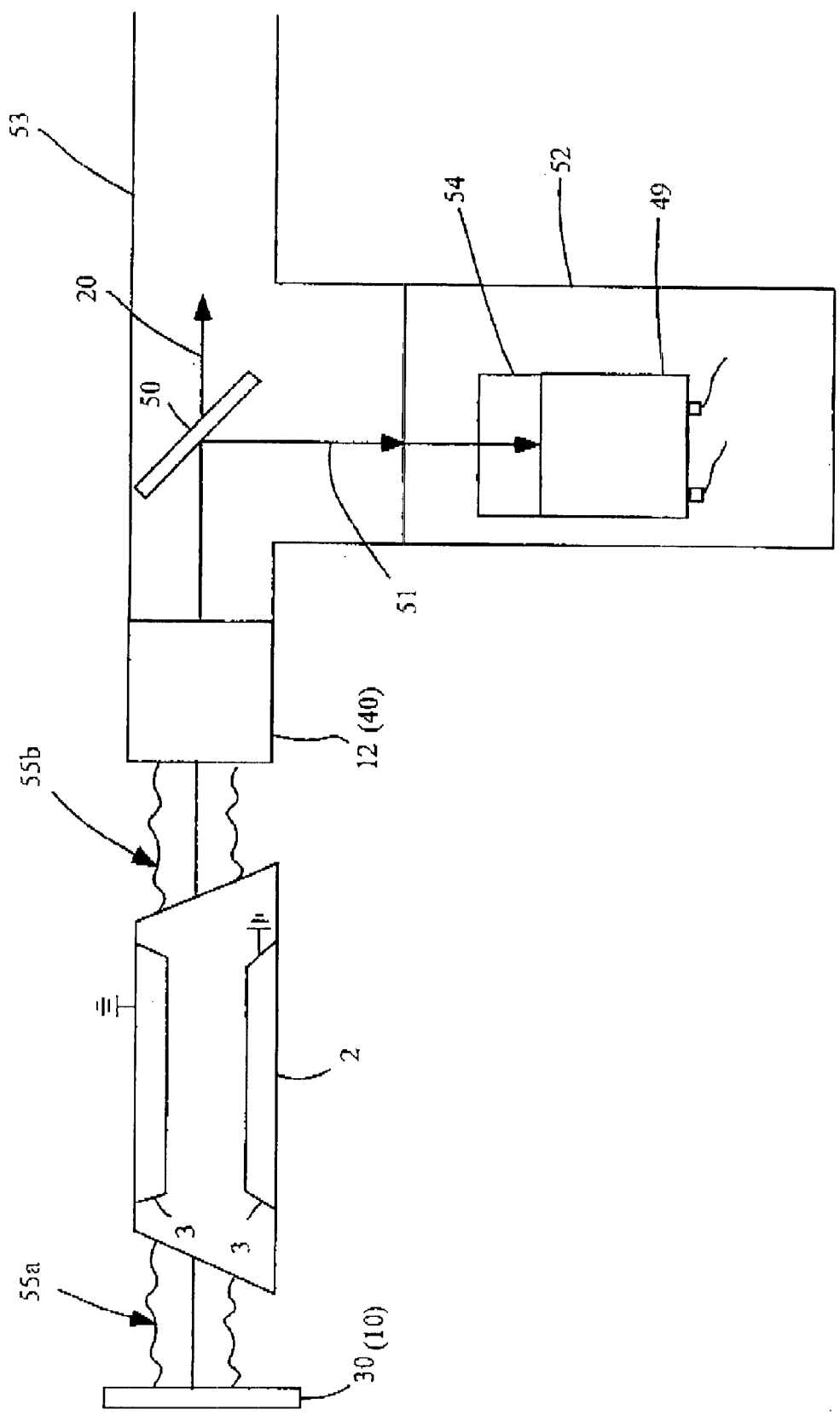
FIG. 13 shows an energy detector for use with a $F_2$ laser system in accord with the fifth aspect of the invention.

FIG. 13 shows an energy detector 49 for use with a $F_2$ laser system in accord with a seventh embodiment and the fifth aspect of the invention. A beam splitter 50 redirects a beam portion 51 towards the energy detector 49, allowing the main beam 20 to pass through. The detector 49 may be a diode or photomultiplier detector, and may be a diamond detector such as that set forth in U.S. patent application Ser. Nos. 09/512,417 and 60/122,145, which are assigned to the same assignee as the present application and hereby incorporated by reference. The detector 49 is preferably particularly designed to be sensitive at 157 nm. Optics for filtering the red emission of the laser may be included such as a dispersive element, holographic beam splitter, dichroic mirror(s), or red light filter before the detector, or otherwise as set forth at U.S. patent application Ser. Nos. 09/598,552 and 60/166,952, assigned to the same assignee and hereby incorporated by reference.

The detector 49 is advantageously enclosed in a sealed enclosure 52. The sealed enclosure 52 is preferably sealably connected with a beam path enclosure 53 that encloses the path of the outcoupled main beam 20 and that is itself sealably connected to the laser resonator such that the beam 20 is never exposed to and absorbed by oxygen and water in ambient air (see U.S. patent application Ser. No. 09/343,333, which is assigned to the same assignee as the present application and is hereby incorporated by reference). The entire resonator itself is also kept free of the photoabsorbing species such as by using a pair of smaller enclosures 55a and 55b between the laser tube 2 and the rear and front optics modules 10 or 30 and 12 or 40, respectively.

Photoabsorbing species such as oxygen, hydrocarbons and water are removed from the enclosure 52, such as by pumping them out with a high vacuum pump, such as a turbo pump, or by pumping for a long time with a rotory or mechanical (roughing) pump. The pumping can be continued until high vacuum is reached. However, preferably only a roughing pump (not shown) is used and a series of pumping steps each followed by purging with inert gas are performed more quickly and with better results, such as is described in the '333 application relating to the beam path enclosure 53.

After the contaminants are removed, a low flow of inert gas such as argon or helium continuously purges the sealed enclosure while the laser is operating. The enclosure 52 and the enclosure 53 may be open to one another such that the same purging gas fills both enclosures 52 and 53, or the enclosures 52 and 53 may be separately maintained. The flow rate of the purging inert gas is selected such that only a slight overpressure is maintained in the enclosure 52. For example, 1–10 mbar overpressure is preferred, and up to 200 mbar overpressure could be used. The flow rate may be up to 200 liters/hour, and is preferably between ten and fifty liters/hour. The flow rate and pressure in the enclosure are precisely maintained using a pressure regulator, flow-control valves and a pressure gauge.

Advantageously, the slight overpressure, precisely maintained, of the low flow purge in accord with the fifth aspect of the invention may prevent the strain on optical surfaces that a high flow, high pressure purge or a vacuum would produce. Fluctuations of the refractive index with pressure in the enclosure may also be reduced in accord with this fifth aspect. Moreover, turbulences typically observed with high flow purges are avoided, and the rate of contamination deposition on optical surfaces is reduced according to this fifth aspect.

An attenuator 54 is preferably positioned before the detector 49 to control the intensity of the incoming light at the sensitive detector 49. The attenuator preferably includes a mesh filter. The attenutor 54 may include a coating on the detector 49 such as is set forth at U.S. patent application Ser. No. 09/172,805, which is assigned to the same assignee as the present application and is hereby incorporated by reference.

Figure 14A:
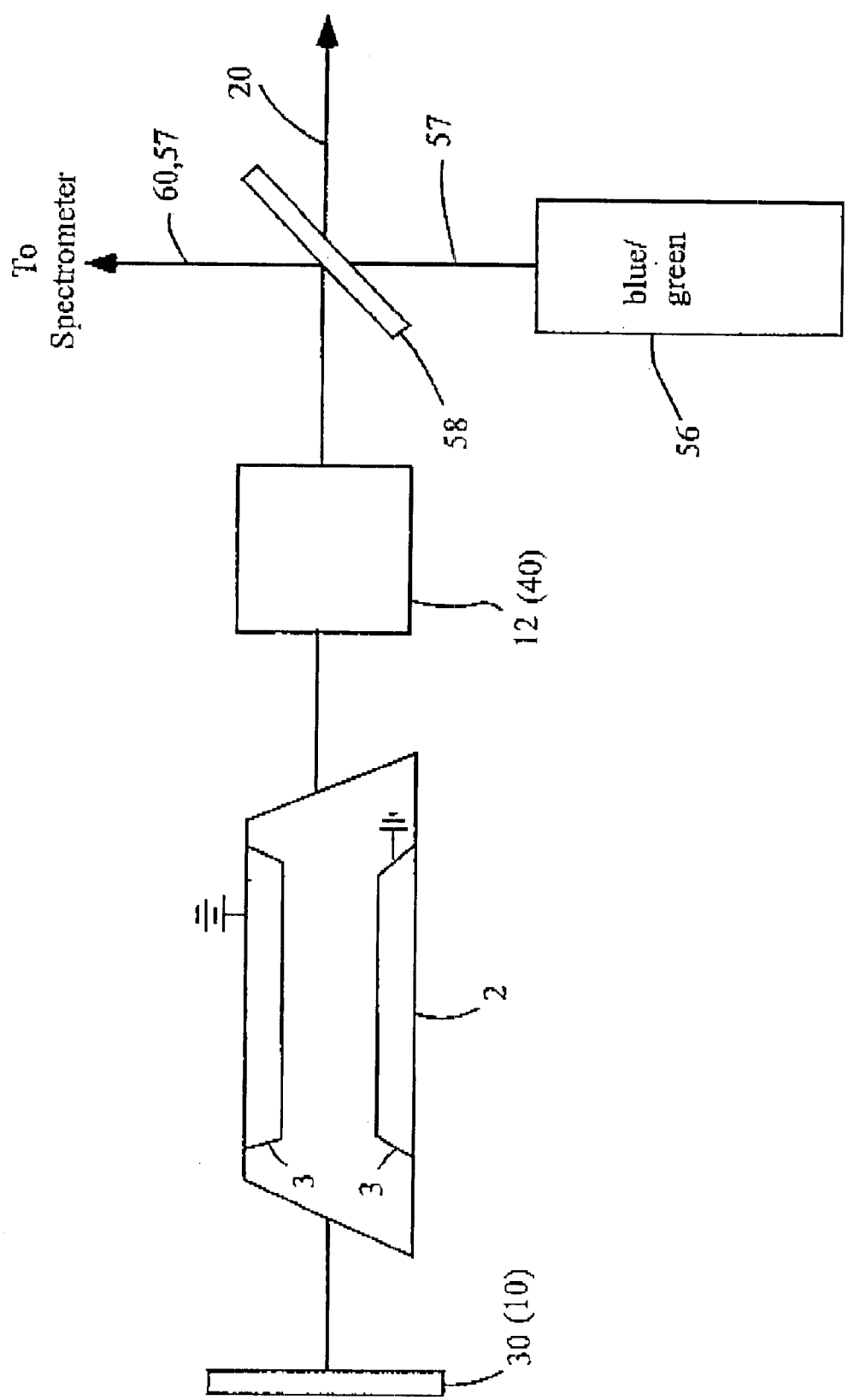
FIG. 14a shows a $F_2$ laser system including a blue or green reference beam for wavelength calibration in accord with the sixth aspect of the invention.

FIG. 14a shows a $F_2$ laser system including a blue or green reference laser 56 for emitting a blue or green beam 57 for wavelength calibration in accord with an eighth embodiment and the sixth aspect of the invention. Wavelength calibration techniques using a reference beam 57 and coupling the reference beam 57 with a beam portion 60 of the main laser beam 20 into a spectrometer (not shown) are set forth at U.S. patent application Ser. No. 09/271,020, which is assigned to the same assignee as the present application, and U.S. Pat. No. 5,373,515, each of which is hereby incorporated by reference. Conventional techniques typically use the red emission of a He—Ne laser (which has two lines at 633 nm and 543 nm) for performing this wavelength calibration. However, the red emission (around 630–780 nm) of the $F_2$ laser can hinder those techniques in at least two ways. First, it maybe desirable to reflect out or otherwise filter the red emission from the $F_2$ laser from the main beam portion 60 to improve the spectrometric performance. Second, it may be difficult to resolve a red reference beam from the red emission of the $F_2$ laser during the spectrometry.

For each of these reasons, a blue or green reference beam 57 is used advantageously in accord with the present invention. A solid-state diode laser that emits blue or green light (e.g., below 550 nm, and preferably below 500 nm) is preferably used to generate the reference beam 57. The red emission from the $F_2$ laser can then be filtered or reflected out from the main beam portion 60 without affecting the reference beam 57. Also, the blue or green light (below 550 nm) of the reference beam 57 can be easily resolved from the red emission (630 nm and above) of the $F_2$ laser.

Figure 14B:
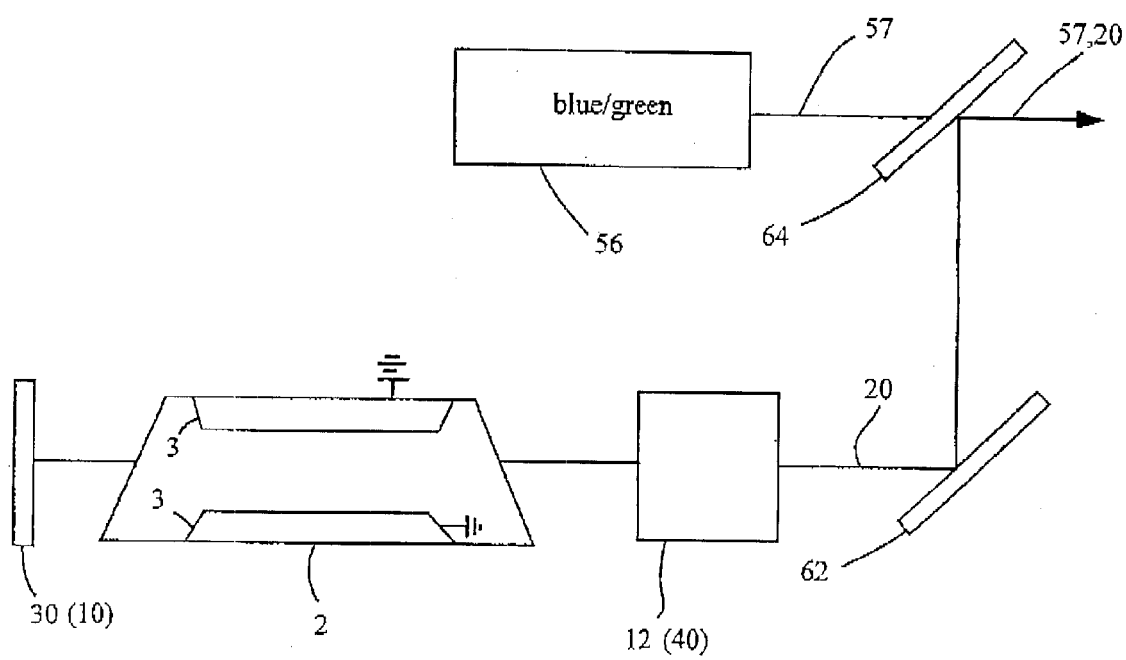
FIG. 14b shows a $F_2$ laser system including a blue or green reference beam for beam alignment stabilization accord with the sixth aspect of the invention.

FIG. 14b shows a $F_2$ laser system for beam alignment stabilization in accord with a ninth embodiment and the sixth aspect of the invention. A reference beam 57 is emitted from a blue or green laser, such as a solid state diode laser, and the main beam 20 is redirected by the reflectors 62 and 64 to be collinear with the reference beam 57. Other methods are possible and understood by persons of ordinary skill in the art. The alignment of the main beam 20 is stabilized using the reference beam 57 as a beam guide. Advantageously, the red emission doesn't disturb the use of the reference beam, as discussed above with respect to FIG. 14a. Other beam alignment techniques that may be used with the $F_2$ laser system of the present invention are described at U.S. Pat. No. 6,014,206, which is assigned to the same assignee as the present application and is hereby incorporated by reference.

Figure 15A:
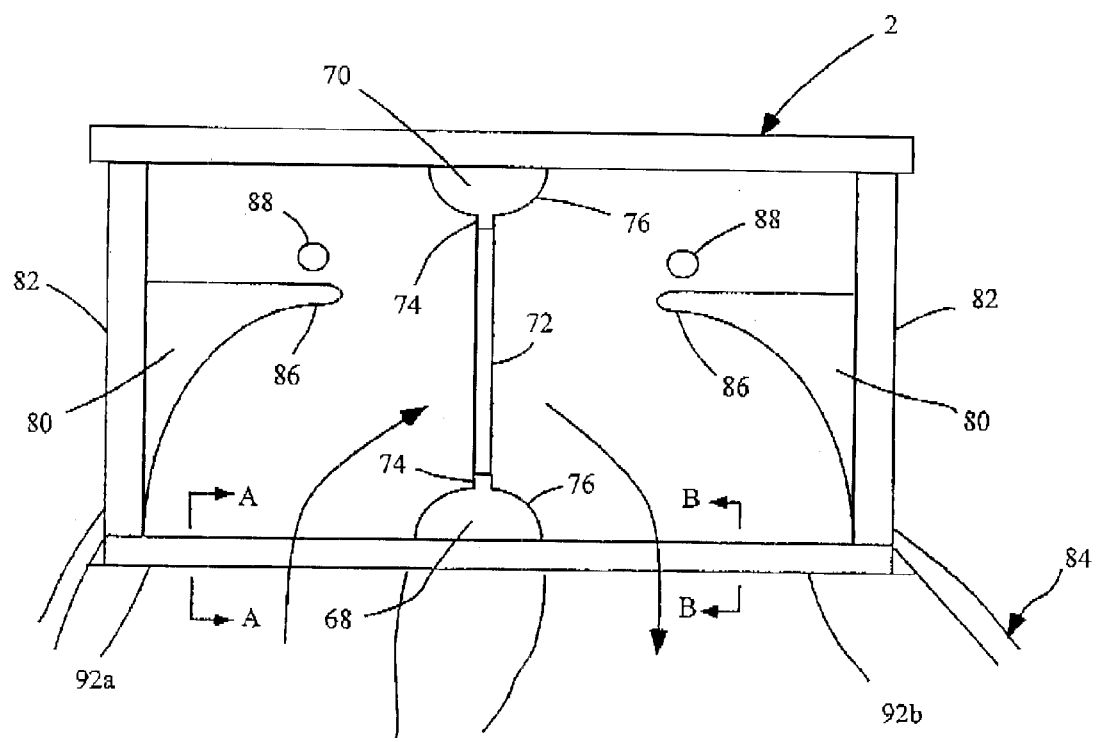
FIG. 15a shows a discharge chamber for a $F_2$ laser in accord with a seventh aspect of the invention.
Figure 15B:
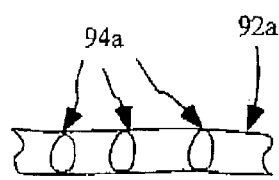
FIG. 15b shows a cross sectional view of the ribs crossing the gas flow of the laser tube of FIG. 9a where the gas flows into the discharge chamber from the gas flow vessel, wherein the ribs are separated by openings to permit the gas flow and aerodynamically shaped to provide more uniform gas flow and the ribs further serve as low inductivity current return bars.
Figure 15C:
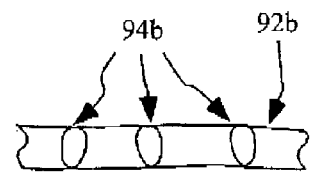
FIG. 15c shows a cross sectional view of the ribs crossing the gas flow of FIG. 9a separated by openings to permit gas flow from the discharge chamber back into the gas flow vessel, wherein the ribs are aerodynamically shaped and separated by openings through which gas exits the discharge chamber and flows back into the gas flow vessel.

FIGS. 15a–15c illustrate a discharge chamber for a $F_2$ laser in accord with a tenth embodiment and the seventh aspect of the invention. As noted, it is desired to operate the $F_2$ laser at high repetition rates (e.g., more than 1 kHz, e.g., 2–4 kHz and above). To achieve this, the clearing ratio, or the gas flow rate (v) through the discharge area divided by the discharge width (d), or v/d, has to be improved over that which was sufficient at lower repetition rates (e.g., 600–1000 Hz). This is because preferably substantially all of the gas within the discharge volume at the time of a previous discharge moves out of the discharge volume and is replaced by fresh gas prior to the next discharge.

So, for a $F_2$ laser having a preferred repetition rate of 2–4 kHz or more, the clearing ratio to achieve the just stated object would be 2000=v/d, or a value twice as large as for a $F_2$ laser having a repetition rate of 1 kHz. Thus, either the gas flow rate v may be increased (without enhanced turbulence) or the discharge width d may be reduced to increase the clearing ratio. Both of these are achieved in accord with the tenth embodiment. Preferably, the tenth embodiment incorporates the discharge chamber design and electrode configuration set forth at U.S. patent application Ser. Nos. 09/453,670 and 60/128,227, which are assigned to the same assignee as the present invention, and which are hereby incorporated by reference. Some of the preferred details are set forth below and shown in FIGS. 15a–15c, and alternative embodiments are described in the '670 application.

FIG. 15a illustrates the tenth embodiment relating to the shape of the main discharge electrodes 68 and 70, and the design of the discharge chamber 2 itself. The shapes of the discharge electrodes 68 and 70 significantly effect characteristics of the discharge area 72, including the discharge width d. Therefore, at least one, and preferably both, of the electrodes 68 and 70 includes two regions. One of these regions, the center portion 74, substantially carries the discharge current and provides a uniform and narrow gas discharge width. The other region, or base portion 76, preferably in collaboration with other conductive and dielectric elements within the discharge chamber, creates preferred electrical field conditions in and around the discharge area 72 and also contributes to the smoothness and uniformity of the gas flow in the vicinity of the discharge electrodes 68 and 70.

The center portions 74 and base portions 76 preferably form electrode 68 and 70 each having a single unit construction, and composed of a single material. The center and base portions 74 and 76 may also comprise different materials, but the different materials should have compatible mechanical and thermal properties such that mechanical stability and electrical conductivity therebetween is sufficiently maintained. The center portion 74 and the base portion 76 come together at a discontinuity or irregularity in the shape of the electrodes 68 and 70. A significant deviation of the electrical field occurs at the location of the irregularity in such a way that gas discharge occurs substantially from/to the center portions 74 drastically reducing the discharge width.

The center portions 74 are shaped to provide a uniform gas discharge having a narrow width. The base portions 76 may be shaped according to any of a variety of smooth curves or a combination of several smooth curves including those described by circular, elliptical, parabolic, or hyperbolic functions. The curvatures of the base portions 76 may be the same or different, and have the same direction of curvature with respect to the discharge area 72, i.e., the base portions 76 each curve away from the discharge area 72 away from the center portion 74. Alternatively, the base portion 76 of the high voltage main electrode 70 may have opposite curvature to the base portion 76 of the electrode 68. That is, the base portion 76 of the electrode 70 may curve toward the discharge area 72, while the base portion 76 of the electrode 68 curves away from the discharge area 60. The alternative configuration provides an even more aerodynamic channel for gas flow through the discharge area 72 because the electrode shapes both conform with the shape of the gas flow.

The electrodes 68 and 70 may alternatively have a regular shape and no discontinuity between base and center portions 74 and 76. The shape of the center portions 74 of the electrodes 68 and 70 in this alternative configuration is preferably similar to that described above and shown. However, the base portions 76 taper to the center portions in a triangular shape where the apexes of the triangular shaped based portions 76 are the center portions and are rounded as described above.

FIG. 15a also shows a pair of preferred spoilers 80 in accord with the tenth embodiment. The spoilers 80 are preferably integrated with the chamber at the dielectric insulators 82 on either side of the discharge area 72. The spoilers 80 may be integrated parts of a single unit, single material dielectric assembly with the insulators 82, or they may comprise different materials suited each to their particular functions. That is, the spoilers 80 and the dielectric insulators 82 may be formed together of a common material such as ceramic to provide an aerodynamic laser chamber 2 for improved gas flow uniformity. Alternatively, the spoilers 80 may be attached to the insulating members 82.

The spoilers 80 are aerodynamically shaped and positioned for uniform gas flow as the gas flows through the chamber 2 from the gas flow vessel 84 (partially shown), through the discharge area 72 and back into the gas flow vessel 84. Preferably, the spoilers 80 are symmetric in accord with a symmetric discharge chamber design.

One end 86 of each of the spoilers 80 is preferably positioned to shield a preionization unit 88 from the main electrode 68, and is shown in FIG. 15a extending underneath one of the pre-ionization units 88 between the preionization unit 88 and the main electrode 68. These ends 86 of the spoilers 80 are preferably positioned close to the preionization units 88. For example, the ends 86 may be just a few millimeters from the preionization units 88. By shielding the preionization units 88 from the main electrode 68, arcing or dielectric breakdown between the preionization units 88 and the main electrode 68 is prevented. The spoilers 80 serve to remove gas turbulence zones present in conventional discharge unit electrode chambers which occur due to the sharp curvature of the gas flow in the vicinity of the preionization units 88 and of the grounded discharge electrode 68.

FIGS. 15b–15c illustrate another feature in accord with the seventh aspect of the invention. As discussed above, the dielectric insulators 82 of the electrode chamber isolate the high voltage main electrode 70. The gas flow is crossed by a first rib configuration 92a where the gas flow enters the electrode chamber 2 from the gas flow vessel 84 and by a second rib configuration 92b where the gas flow exits the electrode chamber 2 and returns the gas back into the gas flow vessel 84. The ribs 94a, 94b, which are current return bars, are separated by openings for the laser gas to flow into and out of the electrode chamber 2 from/to the gas flow vessel 84. The ribs 94a, 94b are preferably rigid and conducting, and are connected to the grounded main discharge electrode 68 to provide a low inductivity current return path. The conducting ribs 94a of the rib configuration 92a are preferably substantially shaped as shown in FIG. 15b. The conducting ribs 94b of the rib configuration 92b are preferably substantially shaped as shown in FIG. 15c. The ribs 94a and 94b of the rib configurations 92a and 92b, respectively, are asymmetrically shaped.

FIG. 15b is a cross sectional view A—A of the rib configuration 92a through which the laser gas enters the electrode chamber 2 from the gas flow vessel 84. The ribs 94a of the rib configuration 92a each have a wide upstream end which meets the laser gas as it flows from the gas flow vessel 84, and a narrow downstream end past which the laser gas flows as it enters the discharge chamber. Preferably, the ribs 94a are smoothly tapered, e.g., like an airplane wing, from the wide, upstream end to the narrow, downstream end to improve gas flow past the rib configuration 92a.

FIG. 15c is a cross sectional view of the rib configuration 92b through which the laser gas exits the electrode chamber 2 and flows back into the gas flow vessel 84. The ribs 94b of the rib configuration 92b each have a wide upstream end which meets the laser gas as it flows from the electrode chamber 2, and a narrow downstream end past which the laser gas flows as it enters the gas flow vessel 84. Preferably, the ribs 94b are smoothly tapered, e.g., like an airplane wing, from the wide, upstream end to the narrow, downstream end to improve gas flow past the rib configuration 92b.

The aerodynamic ribs 94a and 94b each provide a reduced aerodynamic resistance to the flowing gas from that provided by conventional rectangular ribs. Together, the effect aerodynamic spoilers 80 and the aerodynamic ribs 94a and 94b permit the flow rate of the gas through the chamber 2 to be increased without excessive turbulence. The increased gas flow rate through the discharge area 72, together with the reduced discharge width provided by the advantageous design of the electrodes 68 and 70, results in an increased clearing ratio in accord with high repetition rates of operation of the $F_2$ laser of the present invention.

Figure 16A:
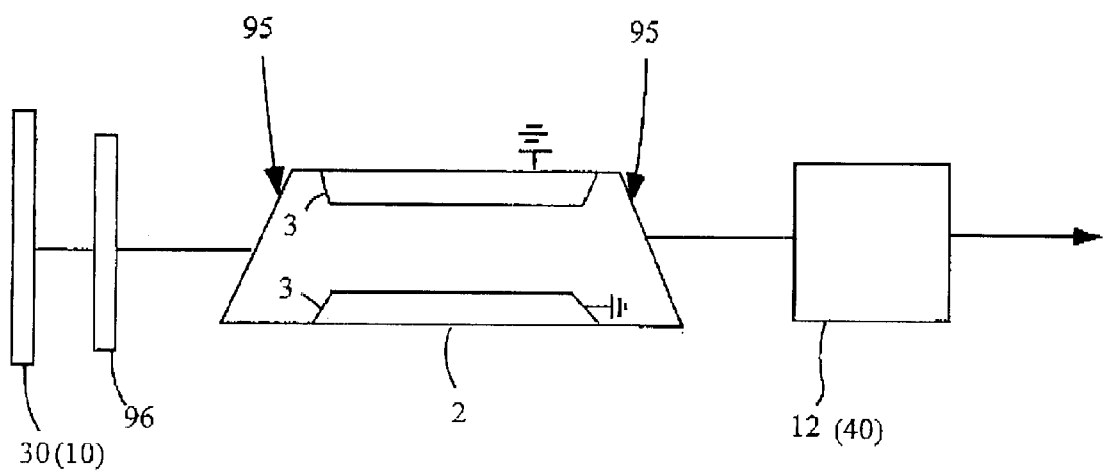
FIG. 16a shows a $F_2$ laser resonator, particularly having Brewster windows on the discharge tube, for providing a substantially polarized output beam in accord with the eighth aspect of the invention.

FIG. 16a shows a $F_2$ laser resonator for providing a substantially polarized output beam in accord with the eighth aspect of the invention. First, Brewster windows 95 are preferably provided on the laser chamber 2 ideally exhibiting 100% transmission of π-polarized light and having a lower transmissivity of ρ-polarized light. As discussed, for lasers wherein the beam undergoes a large number of roundtrips, this effect of using Brewster windows substantially serves to polarize the beam. However, for the $F_2$ laser wherein only 1–2 roundtrips occur, the polarization is not as high as desired. Thus, other optical elements may be aligned at Brewster's angle such as prisms, etalons, grisms, etc. for higher polarization. In addition, a thin film polarization plate 96 is shown in FIG. 16a for providing the desired polarization, e.g., above 98%.

Figure 16B:
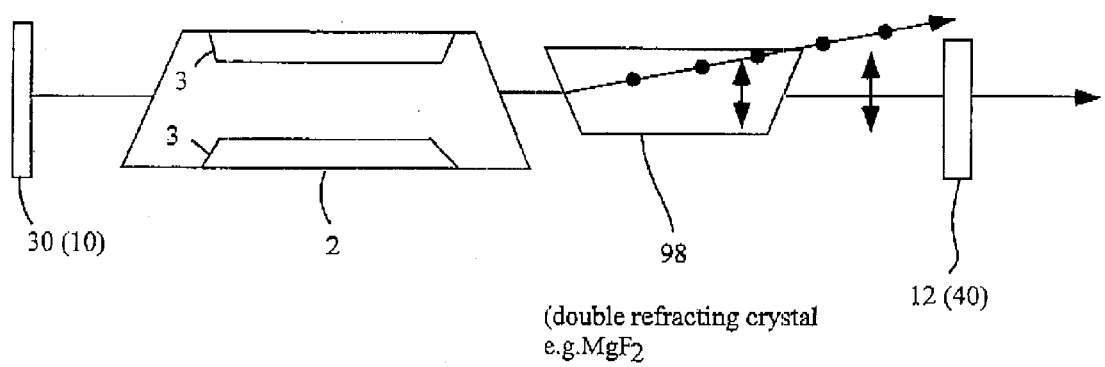
FIG. 16b shows a $F_2$ laser resonator for providing a substantially polarized beam also in accord with the eighth aspect of the invention.

FIG. 16b shows a $F_2$ laser resonator for providing a substantially polarized beam also in accord with the eighth aspect of the invention. FIG. 16b shows laser resonator including a double refraction crystal or prism 98 for polarizing the beam in accord with the eighth aspect of the invention. As shown at FIG. 16b, a double refracting crystal 98 comprising a birefringent material such as $MgF_2$ is used to refract one polarization component out of the resonator. In this regard, alternative configurations may be found at U.S. patent application No. 60/212,257, which is assigned to the same assignee as the present application and is hereby incorporated by reference. The double refracting crystal may be used as an output coupler, as well. Also, the double refracting crystal may have beam entrance and/or exit surfaces aligned at Brewster's angle to the beam for additionally improved polarization performance.

The objects of the invention have been met as described above with regard to the first through eighth aspects of the invention. An efficient $F_2$ laser for industrial, commercial and scientific applications such as photolithography and other materials processing applications has been generally described. Improved line-selection techniques for the $F_2$ laser have been set forth in the first through third aspects of the invention. Techniques for monitoring the quality of the line selection being performed was set forth in the fourth aspect of the invention. An energy detector for use with the $F_2$ was described as the fifth aspect of the invention. Techniques for reducing the influence of the visible emission on the performance of the $F_2$ laser have been shown and described according to the sixth aspect of the invention. A laser chamber for operating a $F_2$ laser at high repetition rates has been set forth in the seventh aspect of the invention. Finally, A $F_2$ laser that emits a substantially polarized beam, e.g., such that the beam exhibits a 98% or greater polarization has been describe with respect to the eighth aspect of the invention.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A $F_2$ laser, comprising:
   a discharge chamber filled with a laser gas mixture including molecular fluorine for generating a spectral emission including a plurality of closely-spaced lines in a wavelength range between 157 nm and 158 nm, said plurality of closely spaced lines including a primary line centered around 157.62 nm and a second line centered around 157.52 nm;
   a plurality of electrodes within the discharge chamber connected with a power supply circuit for energizing the molecular fluorine; and
   a laser resonator including a line selection unit located on a same side of the discharge chamber as the laser beam is outcoupled for selecting the primary line around 157.62 nm and suppressing said secondary line around 157.52 nm from an acceptance angle of said beam, such that the F₂ laser emits a single wavelength laser beam having a narrow spectral bandwidth to provide a narrow band VUV beam, and wherein said line-selection unit is located on the same side of the discharge chamber as the outcoupled laser beam such that radiation emanating directly from the discharge chamber is line-selected by the line-selection unit prior to being output coupled from said resonator, said location of said line-selection unit providing increased effectiveness of the line-selection and improved spectral purity, since the F₂ laser pulse duration is relatively short when compared with a pulse of a rare gas-halide excimer laser.

2. The F₂ laser of claim 1, wherein the line-selection unit includes a transmission diffraction grating arranged at a particular orientation for dispersing the plurality of closely-spaced lines including the primary and secondary lines such that only the primary line centered around 157.62 nm remains within the acceptance angle of the resonator and the secondary line centered around 157.52 nm is dispersed outside the acceptance angle of the resonator, such that the F₂ laser emits a single wavelength laser beam having a narrow spectral bandwidth to provide a narrow band VUV beam.

3. The laser of claim 1 wherein the grating comprises a material selected from the group of materials consisting of calcium fluoride, barium fluorine, strontium fluoride, magnesium fluoride and lithium fluoride.

4. The laser of claim 1, wherein the grating further output couples the laser beam by reflecting a portion of the beam back into the discharge chamber and by dispersing the remainder of the beam not reflected back into the discharge chamber, to separate the primary and secondary lines, such that a main beam has a spectral distribution substantially centered around said primary line and substantially not including said secondary line.

5. The laser of claim 1, wherein the grating further output couples the laser beam by dispersively reflecting a portion of the beam back into the discharge chamber, such that said primary line is amplified within the discharge chamber and the secondary line is dispersed away from an acceptance angle of the resonator, and by transmitting a main beam having a spectral distribution substantially centered around said primary line and substantially not including said secondary line.

6. The F₂ laser of claim 1, wherein the line-selection unit includes a grism arranged at a particular orientation for dispersing the plurality of closely-spaced lines including the primary and secondary lines such that only the primary line centered around 157.62 nm remains within the acceptance angle of the resonator and the secondary line centered around 157.52 nm is dispersed outside the acceptance angle of the resonator, such that the F₂ laser emits a single wavelength laser beam having a narrow spectral bandwidth to provide a narrow band VUV beam.

7. The laser of claim 6, wherein the grism comprises a material selected from the group of materials consisting of calcium fluoride, magnesium fluoride, barium fluorine, strontium fluoride and lithium fluoride.

8. The laser of claim 6, wherein the grism further output couples the laser beam by reflecting a portion of the beam back into the discharge chamber, and by dispersing the remainder of the beam not reflected back into the discharge chamber to separate the primary and secondary lines, such that a main beam has a spectral distribution substantially centered around said primary line and substantially not including said secondary line.

9. The laser of claim 6, wherein the grism further output couples the laser beam by dispersively reflecting a portion of the beam back into the discharge chamber, such that said primary line is amplified within the discharge chamber and the secondary line is dispersed away from an acceptance angle of the resonator, and by transmitting a main beam having a spectral distribution substantially centered around said primary line and substantially not including said second line.

10. The laser of claim 6, wherein the grism further serves as a highly reflective resonator reflector by dispersing and reflecting the beam, such that said primary line is reflected back into the discharge chamber and said secondary line is dispersed away from an acceptance angle of said beam, such that a main beam ultimately outcoupled from the resonator has a spectral distribution substantially centered around said primary line and substantially not including said secondary line.

11. The laser of claim 10, wherein a same optical element within said line-selection unit both disperses and output couples the laser beam.

12. The laser of claim 11, wherein said beam is dispersed before being outcoupled, such that said primary line is reflected back into the discharge chamber and outcoupled within a accpetance angle of said beam, while said secondary line is dispersed away from the discharge chamber and the acceptance angle of said beam.

13. The laser of claim 11, wherein said beam is dispersed after being outcoupled, such that said primary line remains within an acceptance angle of said outcoupled beam and said secondary line is dispersed away from the acceptance angle of said beam.

14. The laser of claim 11, wherein substantially all of the radiation output coupled from the resonator is subject to dispersion at said line-selecting optical element.

15. The laser of claim 14, wherein said line-selecting optical element is a transmission grating.

16. The laser of claim 14, wherein said line-selecting optical element is a transmission grism.

17. An excimer laser, comprising:
a discharge chamber filled with a laser gas mixture including molecular fluorine, an active rare gas and a buffer gas for generating a broadband spectral emission;

a plurality of electrodes within the discharge chamber connected to a power supply circuit for energizing the gas mixture; and a laser resonator including a grism, which has a grating surface and a prism body thereby including two optical element functions within one optical element and reducing a number of optical surfaces and a size of the resonator so that the resonator is more efficient compared with a laser resonator including separate prism and grating optical elements to perform the two optical element functions of the grism, the grism being arranged at a particular orientation for dispersing the broadband spectrum such that only a selected spectral portion of the broadband spectrum remains within the acceptance angle of the resonator and outer portions of the broadband spectrum are dispersed outside the acceptance angle of the resonator, such that the excimer laser emits a narrowband DUV laser beam.

18. The laser of claim 17, wherein the grism comprises a material selected from the group of materials consisting of calcium fluoride, magnesium fluoride, barium fluorine, strontium fluoride and lithium fluoride.

19. The laser of claim 17, wherein the grism further output couples the laser beam by reflecting a portion of the beam back into the discharge chamber, and by dispersing the remainder of the beam not reflected back into the discharge chamber to narrow the bandwidth of the beam, such that a main beam has a spectral distribution substantially centered around said selected spectral portion and substantially not including said outer portions of said broadband emission spectrum of the excimer laser.

20. The laser of claim 17, wherein the grism further output couples the laser beam by dispersively reflecting a portion of the beam back into the discharge chamber, such that said selected spectral portion is amplified within the discharge chamber and the outer portions are dispersed away from an acceptance angle of the resonator, and by transmitting a main beam having a spectral distribution substantially centered around said selected spectral portion and substantially not including said outer portions of said broadband emission spectrum of the excimer laser.

21. The laser of claim 17, wherein the grism further serves as a highly reflective resonator reflector by dispersing and reflecting the beam, such that said selected spectral portion is reflected back into the discharge chamber and said outer portions are dispersed away from an acceptance angle of said beam, such that a main beam ultimately outcoupled from the resonator has a spectral distribution substantially centered around said selected spectral portion and substantially not including said outer portions of said broadband emission spectrum of the excimer laser.

22. The laser of claim 17, wherein the grating surface of the grism is prepared by ion-beam etching.

* * * * *